(12) United States Patent
Sakura

(10) Patent No.: US 7,170,631 B2
(45) Date of Patent: Jan. 30, 2007

(54) INFORMATION PROCESSING UNIT, PRINTING CONTROL UNIT, AND CONTROL METHOD THEREOF, AND STORAGE MEDIUM, AND CONTROL PROGRAM THEREOF

(75) Inventor: Masayuki Sakura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 10/119,004

(22) Filed: Apr. 10, 2002

(65) Prior Publication Data

US 2002/0159091 A1   Oct. 31, 2002

(30) Foreign Application Priority Data

Apr. 26, 2001   (JP)   .............................. 2001/129742

(51) Int. Cl.
*G06K 1/00* (2006.01)
(52) U.S. Cl. ..................... 358/1.18; 358/1.2; 358/1.15; 358/1.16
(58) Field of Classification Search ............... 358/1.15, 358/1.16, 1.18, 1.2
See application file for complete search history.

(56) References Cited

U.S. PATENT DOCUMENTS

| | | | | |
|---|---|---|---|---|
| 4,849,786 A | * | 7/1989 | Murakami | ................... 399/402 |
| 5,839,033 A | * | 11/1998 | Takahashi et al. | .......... 399/187 |
| 6,206,360 B1 | * | 3/2001 | Urata et al. | ................ 271/9.06 |
| 6,614,546 B1 | * | 9/2003 | Kurozasa | ................... 358/1.15 |
| 6,671,066 B1 | * | 12/2003 | Aikawa et al. | ............ 358/1.18 |
| 2002/0036799 A1 | * | 3/2002 | Sumiyama et al. | ........ 358/1.15 |

* cited by examiner

*Primary Examiner*—Mark Zimmerman
*Assistant Examiner*—Vincent M. Rudolph
(74) *Attorney, Agent, or Firm*—Fitzpatrick, Cella, Harper & Scinto

(57) ABSTRACT

The present invention has an object to provide a mechanism which gives an output result desired by the user when printing a document comprising a plurality of paper sizes in mixture. In the information processing unit disclosed in the embodiments, when paper sizes are mixed, a printing job having job attributes including standard paper information for primarily specifying a direction of paper feeding as to the paper sizes placeable in longitudinal and lateral directions in a printing control unit. In the printing control unit, it is determined from which of a plurality of paper feeding means permitting both longitudinal and lateral paper arrangement the paper is to be fed, regarding the standard paper information and the paper sizes placeable longitudinally and laterally.

16 Claims, 19 Drawing Sheets

PAGE 1   PAGE 2   PAGE 3   PAGE 4

INFORMATION PROCESSING UNIT, PRINTING CONTROL UNIT, AND CONTROL METHOD THEREOF, AND STORAGE MEDIUM, AND CONTROL PROGRAM THEREOF

BACKGROUND OF THE INVENTION

1. Field of the Invention

The present invention relates to an information processing unit, a printing control unit and a control method thereof, and a storage medium and a control program thereof. More particularly, the invention relates to a control method generating printing data for a document in which paper sizes are mixed and a printer driver program in an information processing unit such as a personal computer in which a control program is executed, and a printing control unit such as a printer or a printer controller.

2. Description of the Related Art

When document data of mixed paper sizes are entered from an application executed on a host computer, and a printer driver outputs printing data on the basis of the entered document data, it is the conventional practice that the printer driver outputs the document data entered from the application, respectively in units of page in a specified paper size, and generates printing data to match with the paper sizes.

In an image processing unit having a finishing function of a staple or a puncher, an image processing unit decides the direction of images in the next and subsequent pages, as to the document data to be printed, from a direction of the top page of a document (landscape/portrait) and a paper size, with reference to a binding position for the top page, and outputs the same by appropriately turning the same.

However, the above-mentioned conventional technique is considered to have the following inconveniences.

In a printing control unit receiving printing data and causing a printing section to print the received data, when sequentially processing printing data for which different kinds of paper are mixed, it is possible to accomplish printing processing if these kinds of paper are mounted on paper feed cassettes. The user usually selects "automatic" as a paper feed pointing setting 1501 as in FIG. 15 showing the print setting of a printer driver. By confirming this setting, the printing control unit would automatically selects a paper feeding point (paper feed cassette) containing sheets of paper having a paper size matching with a paper size specified by the application. In the printing control unit, however, when "automatic" is selected to specify a paper feeding point in the print setting of the printer driver, and when the paper size for the printing data of the first page placeable differently such as A4, a problem exists in that it is impossible to determine which of longitudinally placed paper or laterally placed paper is to be fed.

More specifically, when a cassette 1 contains laterally placed A4 paper (fed in the shorter side direction), whereas a cassette 2 contains longitudinally placed A4 paper (fed in the longer side direction), and the setting on an operating panel of the printing control unit is such that the cassette 1 takes priority over the cassette 2, or when the longitudinally placed A4 paper is exhausted, and the laterally placed A4 paper remains in the cassette, specification of the A4 paper size for the first page results in selection of the laterally placed A4 paper, thus leading to paper feed in the shorter side direction. In this case, if A3 sheets are mixed in any of the following pages, the laterally placed A3 paper is fed and printed (in the shorter side direction). Therefore, even when paper is expected by the user to be fed as represented by 401 in FIG. 4, the paper is actually fed as represented by 402.

When binding along the shorter side (top) of A4 paper is specified for the top page, the printing control unit can recognize feeding of the longitudinally placed A4 paper in the longer side direction, but cannot recognize whether or not A3 paper is contained in any of the following pages. It is therefore impossible to recognize whether or not the image of the A4 paper of the top page is to be turned by 180°. This may sometimes lead to paper delivery as represented by 401 in FIG. 4 even when the user expects the paper to be delivered as represented by 403 in FIG. 4.

When determining the paper to be fed, the direction thereof, and the image drawing direction of the next and subsequent pages from the direction and the size of the top page of the printing data in the printing control unit, a problem is presented in that different sizes or pieces of information between pages 1 and 50 lead to different output results between printing of a document of 100 pages from pages 1 through 100, on the one hand, and partially printing the same document from pages 50 through 100, on the other hand.

SUMMARY OF THE INVENTION

The present invention was developed in view of the above-mentioned problems, and has an object to provide, when printing a document comprising a plurality of paper sizes, an information processing unit, a printing control unit and a control method thereof, and a control program and a storage medium thereof, which provide output results desired by the user.

A first object of the present invention is to provide an information processing unit, an information processing method, a printer driver program and a storage medium which, when generating printing data on the basis of document data comprising a plurality of paper sizes in mixture, adds information necessary for obtaining user's desired paper delivery result in a printing control unit receiving the printing data.

A second object of the present invention is to provide an information processing unit, an information processing method, a printer driver program and a storage medium which, when generating printing data on the basis of document data comprising a plurality of paper sizes in mixture, adds information for determining the standard paper for the purpose of causing proper selection of paper feeding means regarding the paper sizes placeable in longitudinal or lateral direction, even when the paper feeding means is set to "automatic" in a printing control unit receiving the printing data.

A third object of the present invention is to provide an information processing unit, an information processing method, a printer driver program and a storage medium which, when generating printing data on the basis of document data comprising a plurality of paper sizes in mixture, adds information for determining a paper delivery pattern so as to ensure an appropriate rotation processing for the purpose of delivering the paper in user's desired paper arrangement in the printing control unit.

A fourth object of the present invention is to provide a printing control unit and a control method thereof for performing printing control so as to obtain a paper delivery result desired by the user when printing a printing job received, comprising a plurality of paper sizes.

A fifth object of the present invention is to provide a printing control unit and a control method thereof which, when printing a received printing job, comprising a plurality of paper sizes in mixture, determines which of the paper feed means is to be selected regarding the paper sizes placeable in the longitudinal or lateral direction, on the basis of information for determining standard paper added to the job attributes.

A sixth object of the present invention is to provide a printing control unit and a control method thereof which, when printing a received printing job, comprising a plurality of paper sizes in mixture, properly determines image directions in individual pages on the basis of information for determining a paper feeding pattern added to the job attributes.

Still another object of the present invention is to provide a printing control unit and a control method thereof which, when printing a received printing job, comprising a plurality of paper sizes in mixture, determines whether or not there is available information showing the presence of a mixed-paper job in the job attributes, conducts mixed-paper printing on the basis of such information if available, determines, if not available, different paper sizes in the printing job, and then conducts mixed-paper printing.

To achieve the aforementioned objects, the present invention has the following configuration.

A first aspect of the present invention provides an information processing unit, which generates printing jobs to be printing-processed on a printing control unit, comprising job attribute generating means which, in the presence of mixed paper sizes, as to paper sizes placeable in the longitudinal direction or in the lateral direction in the printing control unit, generates job attributes added with standard paper information for primarily specifying in which direction the paper is to be fed; and printing job generating means which generates printing data in a case of mixed presence of paper sizes, and generating printing jobs from the printing data and job attributes generated by the job attribute generating means.

A second aspect of the present invention provides a printing control unit which executes printing-processing of a printing job in a case of mixed paper sizes, comprising a plurality of paper feeding means which feed paper in the longitudinal or lateral direction, respectively, for specific paper sizes; and paper feeding means selecting means deciding from which of the plurality of paper feeding means the paper is to be fed, as to the paper sizes placeable in the longitudinal or lateral direction, on the basis of the standard paper information added to the job attributes of the printing job in case of mixed paper sizes; wherein, when processing a page of a paper size placeable in the longitudinal or lateral direction upon printing-processing the printing job in the case of mixed paper sizes, the paper is fed from the paper feeding means selected by the paper feeding means selecting means, and the paper is not fed from paper feeding means of a different paper direction.

A third aspect of the present invention provides a printing control unit executing printing processing of a printing job for mixed paper sizes, comprising a plurality of paper feeding means which feed paper in the longitudinal or lateral direction, respectively, as to specific paper sizes; determining means which determines, when receiving a printing job for a plurality of paper sizes in mixture and printing-processing the same, whether or not there is available information showing that the received job is a mixed-paper job in the job attributes; acquiring means which acquires standard paper information added to the job attributes when it is determined by the determining means that there is available a piece of information indicating the presence of a mixed-paper job in the job attributes; paper size recognizing means which recognizes paper sizes mixed in the printing job through analysis of the printing job when it is determined by the determining means that there is unavailable a piece of information indicating the presence of a mixed-paper job in the job attributes; and paper feeding means selecting means which decides from which of the plurality of paper feeding means the paper is to be fed, as to the paper size placeable in the longitudinal or lateral direction, on the basis of the standard paper information acquired by the acquiring means or the paper sizes recognized by the paper size recognizing means.

The aforementioned problems are solved by means of an information processing method performing the aforementioned processing and a printer driver program and a storage medium achieving such processing in the information processing unit.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments suitable for application of the present invention will now be described. In the invention, a mixed-paper mode will be described. In this embodiment, the mixed-paper mode makes it possible for the user to specify what kinds of paper are mixed and to select in what paper delivery pattern the paper is to be delivered, as properties of printing setting of the printer driver.

Figure 1:
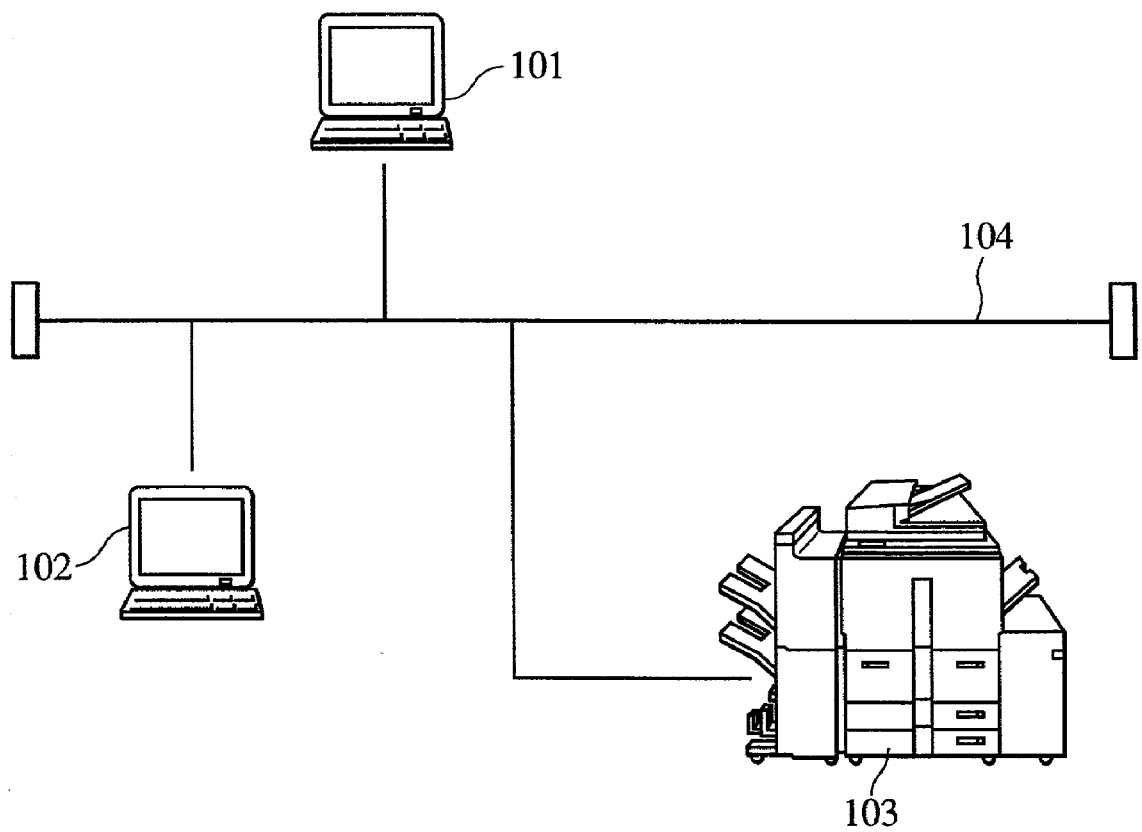
FIG. 1 is a system configuration diagram for illustrating the printing system of an embodiment of the present invention.

FIG. 1 is a system diagram illustrating the printer control system configuration showing an embodiment of the invention. Unless otherwise specified, it is needless to mention that the present invention is applicable to any standalone equipment, a system comprising a plurality of devices, or a system conducting processing through connection via a network such as an LAN or WAN so far as the functions of the present invention are executable.

In FIGS. 1, 101 and 102 represent host computers executing a printer driver program (hereinafter sometimes referred to as "clients"); 103, a printing control unit (a printer or a composite machine having a copy function) having a plurality of paper feed cassettes; and 104, a computer network connecting a client 101 (102) and the printing control unit 103. Since the manner of application is uniform for a plurality of clients connected to the computer network 104, the description will cover only one client (host computer). The printing control unit 103 has a plurality of paper feed cassettes, and no particular limitation is imposed on the number of paper feed cassettes so far as the number is at least two.

Figure 2:
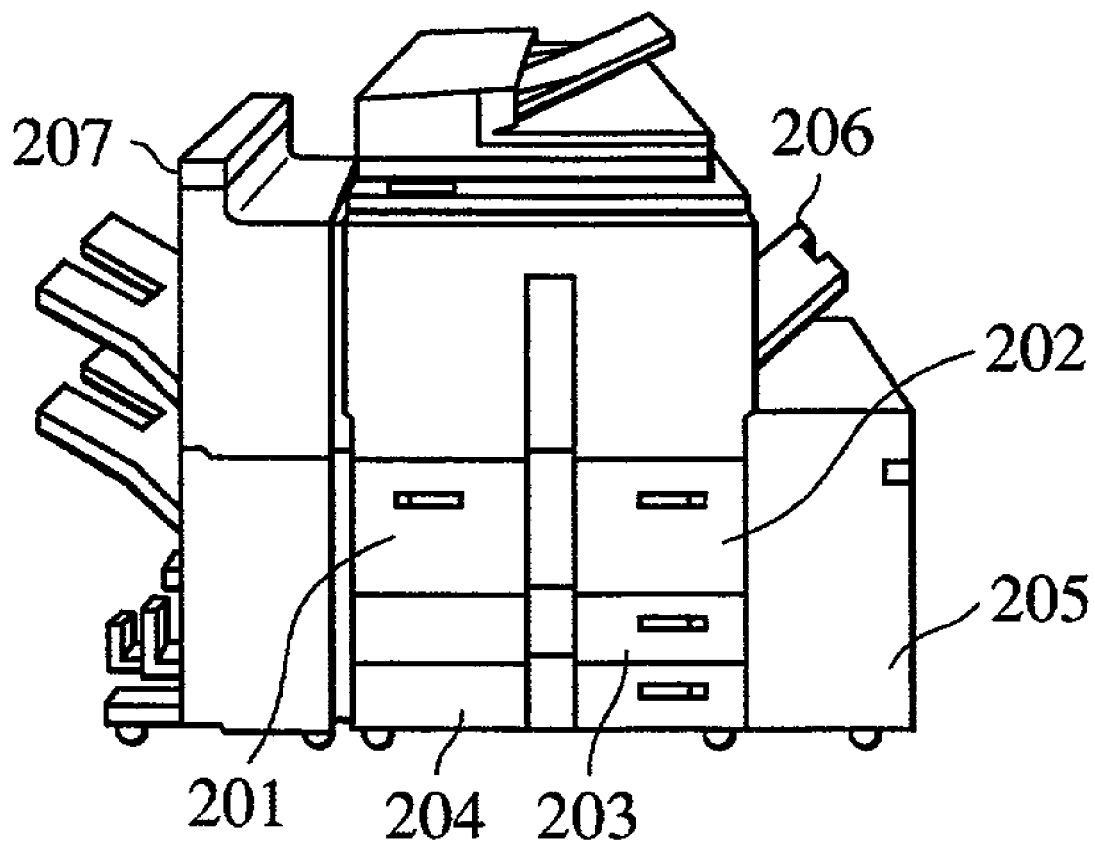
FIG. 2 is an exterior view for illustrating the printing control unit of the invention.

FIG. 2 is an exterior view of the printer: 201, 202 and 205 represent paper feed cassettes capable of housing only A4-sized sheets longitudinally or letter-sized sheets longitudinally; 203 and 204 represent paper feed cassettes capable of housing all the supported paper sizes (A5, A4, A3, B4, B5, letter size and 11×17) and sheets of sizes permitting setting longitudinally or laterally (for example, A4 and letter size) settable both in the longitudinal and lateral directions; 206, a hand feeding section capable of setting all the supported sizes; and 207, a paper delivery tray unit.

Figure 17:
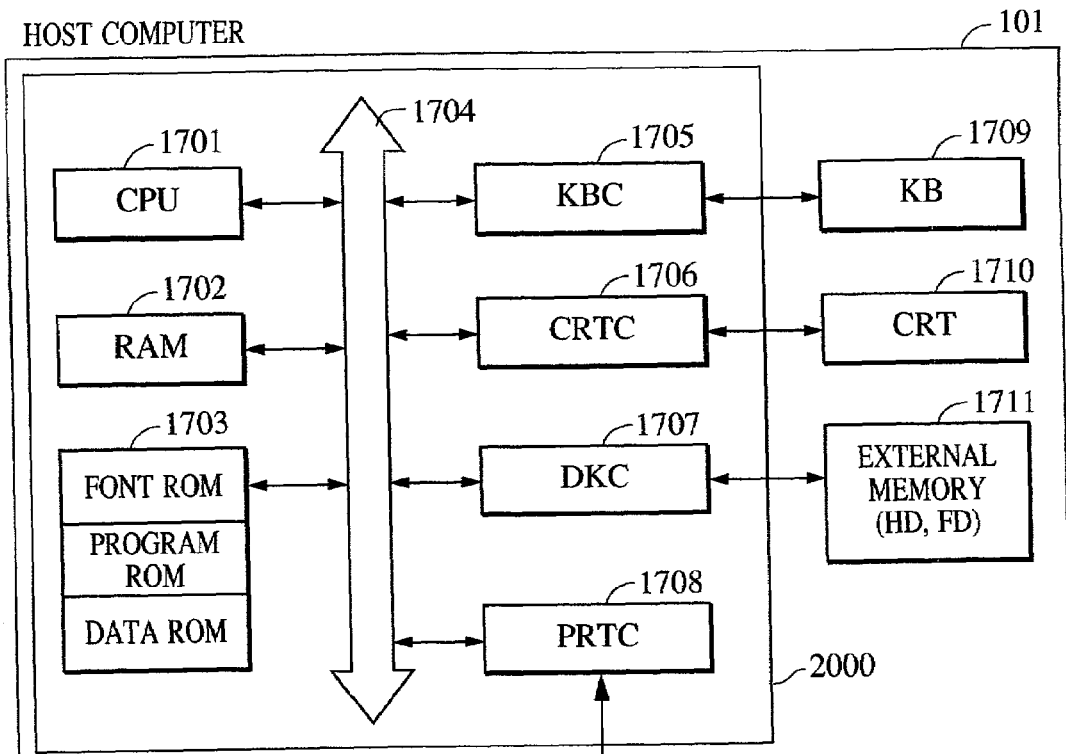
FIG. 17 is a block diagram illustrating the configuration of the information processing unit and the printing control unit of the invention.
Figure 17:
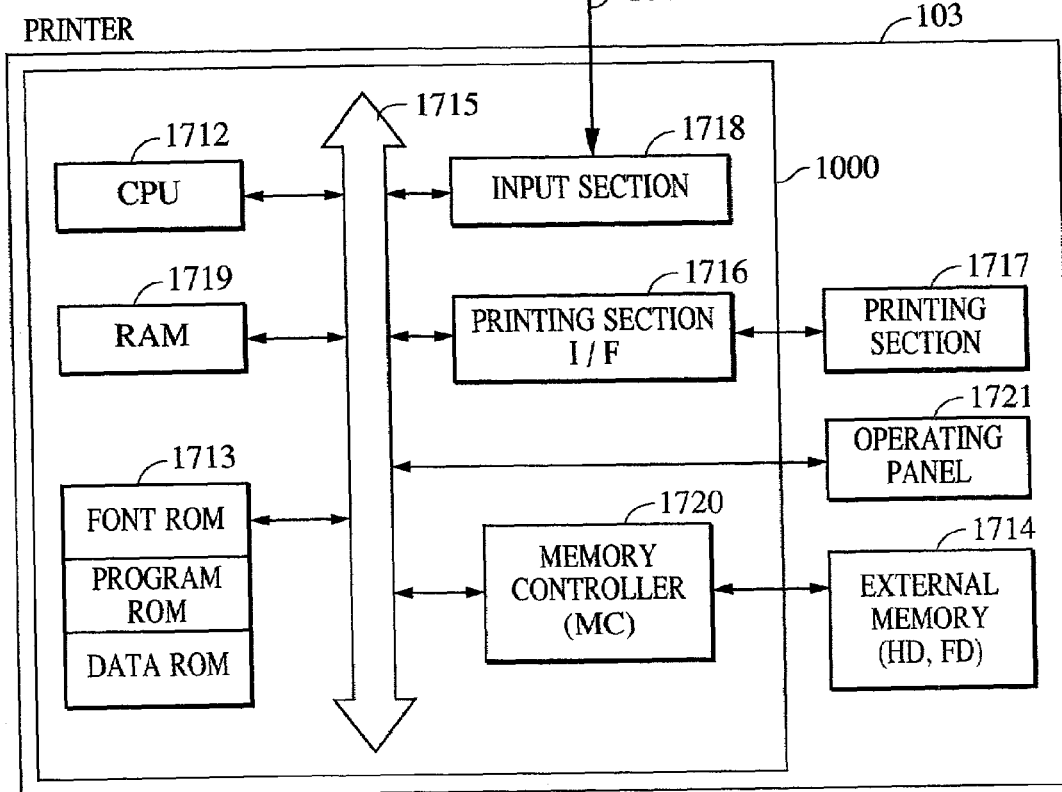

FIG. 17 is a block diagram illustrating the configuration of the printer control system in an embodiment of the invention.

In FIG. 17, 101 represents a host computer which is the information processing unit of the invention, having a CPU 1701 which processes a document comprising graphics, images, characters and tables (including spreadsheet and the like) on the basis of a document processing program and the like stored in a ROM 1703 for programs or an external memory 1711. The CPU 1701 comprehensively controls individual devices connected to a system bus 1704. The ROM for programs 1703 or the external memory 1711 stores an operating system (hereinafter abbreviated as "OS") which is a control program for the CPU 1701 and the like. The ROM 1703 for font or the external memory 1711 stores font data used upon processing the above-mentioned document, and the ROM 1703 for data or the external memory 1711 stores various data used upon processing the above-mentioned document. The printer driver program of the invention is also stored in the ROM 1703 for program or the external memory 1711.

Reference numeral 1702 represents RAM functioning as a main memory and a work area of the CPU 1701; 1705 represents a keyboard controller (KBC) controlling a key-input from a keyboard (KB) 1709 or a pointing device not shown; 1706, a CRT controller (CRTC) controlling display of a CRT display (CRT) 1710; 1707, a disk controller (DKC) which controls access to a hard disk (HD), and external memories 1711 such as a floppy disk (FD) storing boot programs, various applications, font data, user files, edit files, and printer-controlling command generating programs (hereinafter referred to as "printer drivers"); and 1708, a printer controller (PRTC) connected to the printer 103 via a prescribed two-directional interface (interface) or a computer network (LAN) 104, and executing communication control processing with the printer 103. The CPU 1701 executes, for example, rastering of the outline font to display information RAM set in the RAM 1702, thus permitting WYSIWYG on the CRT 1710 which is the display section. The CPU 1701 opens various registered windows and executes processing of various data in accordance with a command instructed by a mouse cursor or the like on the CRT 1710. When executing printing, the user opens the window regarding print setting, and can thus set the printer, and set a printing method for the printer driver including selection of a printing mode.

In the printer 103, including the printing control unit 1000 of the invention, 1712 represents a CPU which outputs an image signal as output information to a printing section (printer engine) 1717 connected to a system bus 1715 on the basis of a control program stored in the ROM 1713 for programs or a control program stored in an external memory 1714. The program ROM of ROM 1713 stores a control program of the CPU 1712 and the like. The font ROM of ROM 1713 stores font data used upon generating such output information, and the data ROM of ROM 1713 stores, for a printer not having an external memory 1714 such as a hard disk, information used on the host computer. The CPU 1712 can communicate with the host computer via an input section 1718, and has a configuration permitting communication of information within the printer to the host computer 101. The printing control program of the invention is stored in the ROM for program of ROM 1713 or in an external memory 1714.

Reference numeral 1719 represents RAM functioning as a main memory and a work area for the CPU 1712 and has a configuration permitting expansion of the memory capacity by an optional RAM connected to an added port not shown. The RAM 1719 is used as an output information rastering area, an environmental data storage area, or an NVRAM. The aforementioned external memory 1714 such as a hard disk (HD) or an IC card is access-controlled by a memory controller (MC) 1720. The external memory 1714 is connected as an option, and stores font data, emulation programs and form data. Reference numeral 1718 represents an operating panel as described above, and has switches for operation and LED displays arranged thereon. The number of the above-mentioned external memories is not limited to one, but must be at least one, and the memory may have a configuration permitting connection of an optional font card in addition to the built-in font, and a plurality of external memories storing a program which interprets printer control languages of different language system. It may also have an NVRAM not shown so as to store printer mode setting information from the operating panel 1721. Reference numeral 1000 represents a printing control unit (controller) performing basic control of the printer 103.

Figure 18:
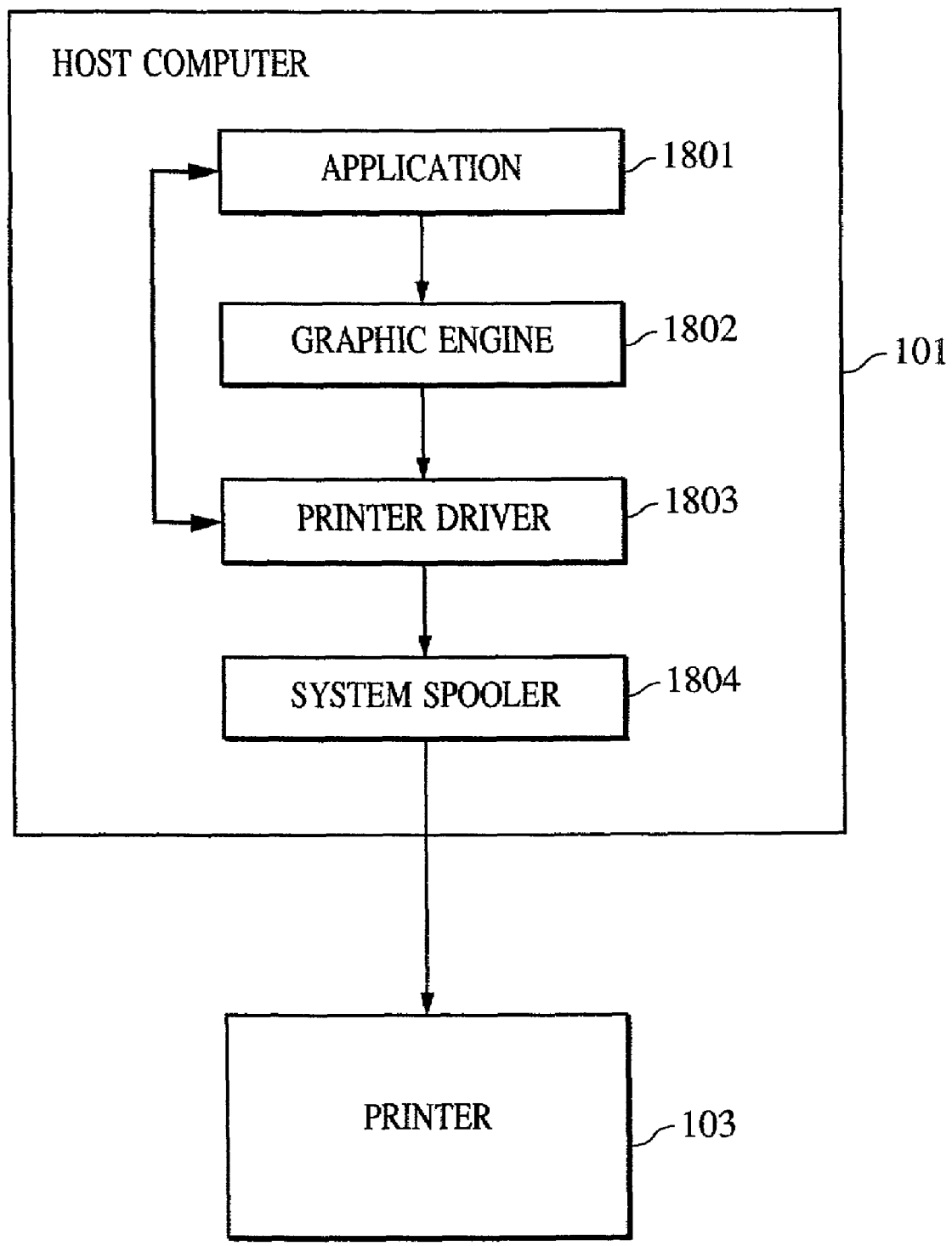
FIG. 18 is a block diagram of each module generating typical printing data in the information processing unit.

FIG. 18 is a configuration diagram of a typical printing processing in the host computer to which a printing unit such as a printer is directly connected, or connected via a network. An application 1801, a graphic engine 1802, a printer driver 1803 and a system spooler 1804 exist as files stored in the external memory 1711, and are program modules loaded in the RAM 1702 for execution by the OS or is a module using the necessary module system execution. The application 1801 and the printer driver 1803 can be added to an FD of the external memory or a CD-ROM not shown, the HD of the external disk 1711 via a network not shown. The application 1801 stored in the external memory 1711 is loaded into the RAM 1702 for execution. When conducting printing from the application 1801 to the printer 103, output (drawing) is performed by use of the graphic engine 1802 made executable similarly by loading into the RAM 1702. The graphic engine 1802 loads the printer driver 1803 provided for each printing unit similarly into the RAM 1702 from the external memory 1711, converts a DFI (Graphic Device Interface) function which is an output of the application 1801 into a DDI (Device Driver Interface) function capable of being interpreted by the printer driver 1803, and outputs the result to the printer driver 1803.

The printer driver 1803 generates printing data including a printer control command capable of being interpreted by the printer 103 which is the printing control unit, on the basis of a DDI function entered from the graphic engine 1802 which is an OS. The printing data including the converted printer control command are transferred from the printer driver 1803 to the system spooler 1804. The system spooler, an OS function, is output to the printer 103 via the network 104.

The printer driver 1803 and the application 1801 can mutually communicate necessary information. For example, as to information about the paper size and the paper direction, the application 1801 must recognize the paper sizes supported by the printer (printer driver), and the printer driver 1803 must recognize the paper size of a document prepared by the application 1801. For some kinds of application 1801, this mutual communication function is not supported.

Figure 19:
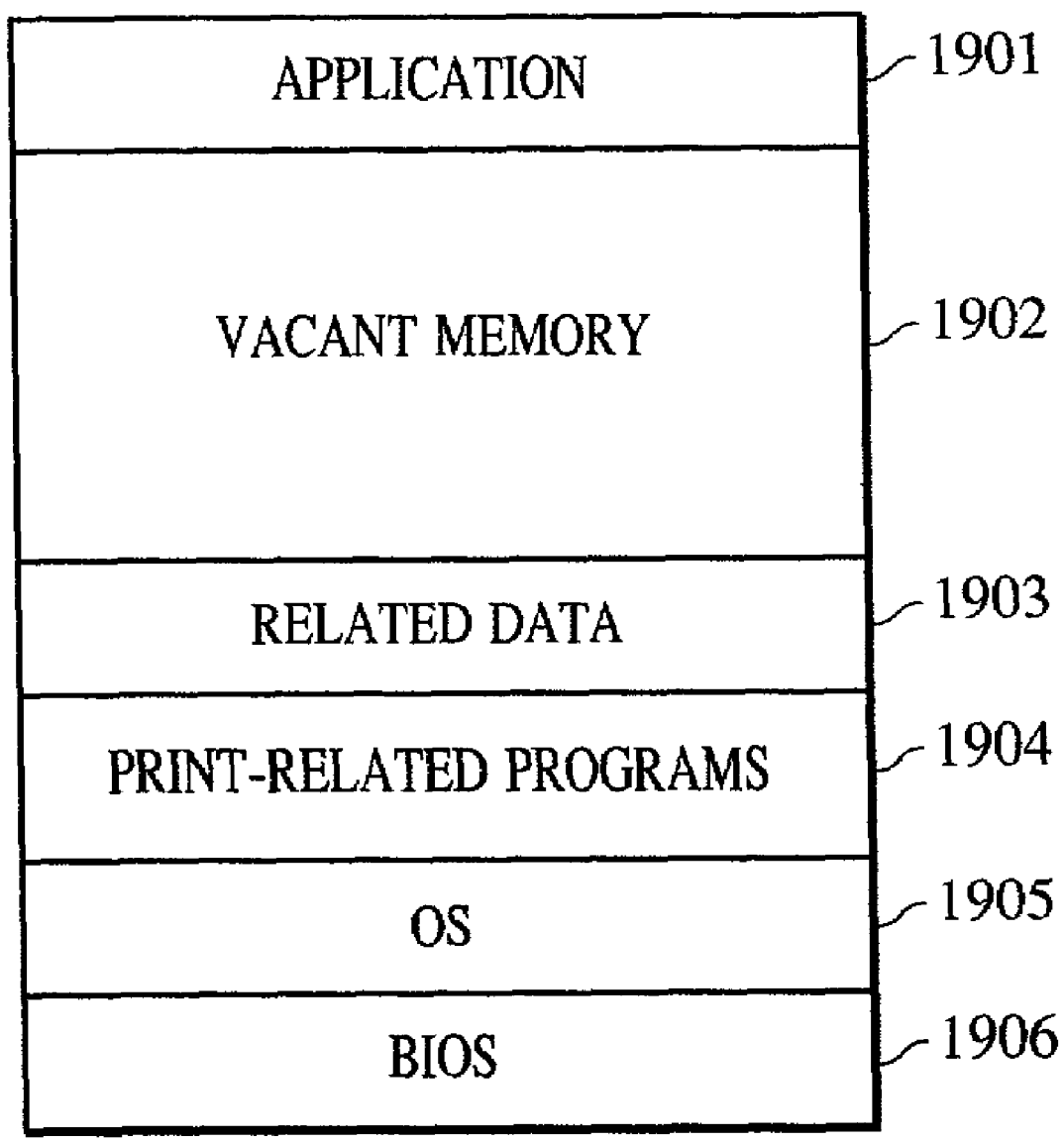
FIG. 19 is a block diagram illustrating a memory map in a state in which printing-related modules containing the printing control program in an embodiment are loaded in RAM and is ready to execution.

The memory map in a state in which the printer driver program in this embodiment is loaded into the RAM 1702 of the host computer and becomes executable is illustrated in FIG. 19. The printer driver program in this embodiment is existent as part of the printing-related program 1904.

Prior to describing embodiments of the present invention, the conventional form of output of a document comprising a mixture of paper sizes will be described.

Figure 3A:
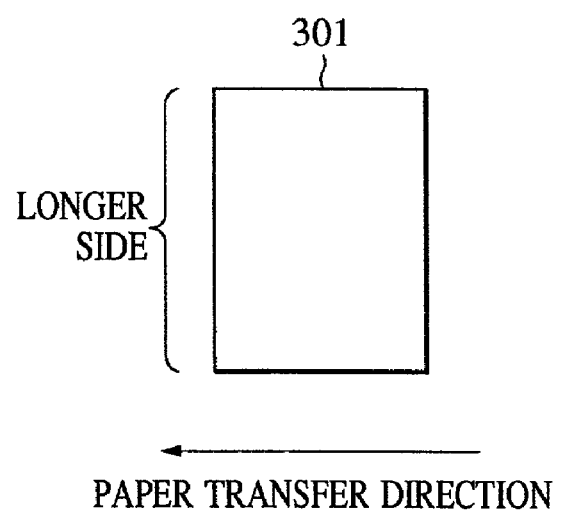
FIG. 3 illustrates the paper feeding method in the longitudinal and lateral directions.
Figure 3B:
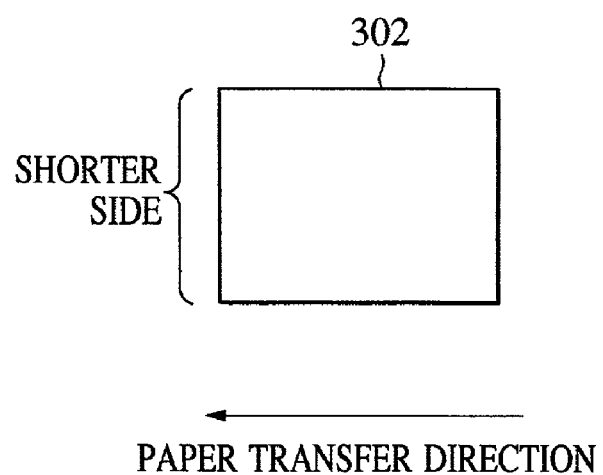

In the printing control unit 103 of this embodiment, A4-sized sheets of paper can be set in the longitudinal and lateral directions in the paper feed cassettes 203 and 204 which are paper feeding means. This finalizes the paper feeding direction. When set in the longitudinal direction, the paper is fed from the longer side as shown by 301 in FIG. 3. That is, the longer side of paper is perpendicular to the paper transfer direction represented by an arrow. When set in the lateral direction, the paper is fed from the shorter side as shown by 302 in FIG. 3. That is, the shorter side of paper is perpendicular to the paper transfer direction. In the printing control unit 103 of this embodiment, A3-sized paper cannot be fed in the longitudinal direction because of the physical limit in size. However, in a printing control unit supporting paper sizes of up to A2, for example, A3-sized paper can be set in any of the longitudinal and lateral directions. The maximum paper size possible to set paper is not particularly regulated in the present invention.

A case where a document comprising a first page of A4 size and a second page of A3 size will now be described. It is assumed here that, in the printing control unit 103, A4-sized paper is set longitudinally in the paper feed cassettes 201 and 202, A4-sized paper is set laterally in the cassette 203, and A3-sized paper is set laterally in the cassette 204.

Figure 4A:
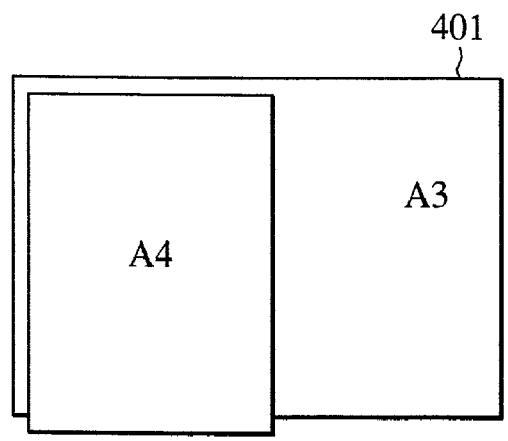
FIG. 4 illustrates a predicted paper feed result in the case of printing a document comprising paper sizes in mixture.
Figure 4B:
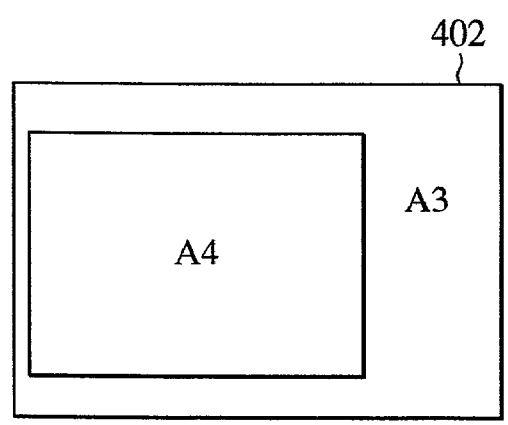
Figure 4C:
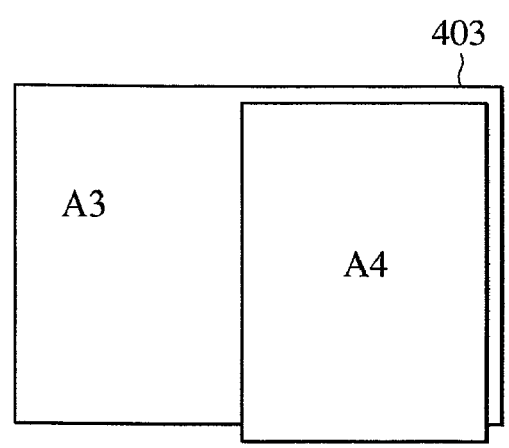

A case where the result of proper paper delivery in compliance with user's desire in this document is as represented by 401 in FIG. 4 will be considered. If the paper is delivered as shown by 401, it is possible to conduct finishing such as staple or punching. In the conventional printing system, however, the printer driver provides information that page 1 is drawn on an A4-sized sheet. Therefore, while the printing control unit recognizes that page 1 is drawn on an A4-sized sheet, but cannot determine whether the longitudinally set A4 or the laterally set A4 is to be fed. As described above about the conventional art, therefore, when paper feeding is set as "automatic" in the print setting of the printer driver, A4 paper (laterally set) of the paper feed cassette 203 may be fed for page 1, depending upon the state of the printing control unit. In this case, the result of paper delivery output is as shown by 402 in FIG. 4, resulting in failure to achieve proper staple or punching.

Figure 5A:
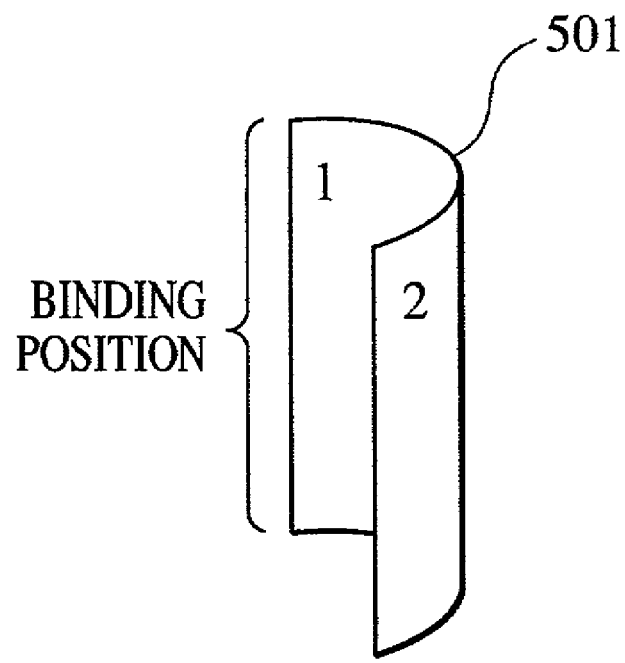
FIG. 5 illustrates the binding position and the image direction in the case of two-sided printing.
Figure 5B:
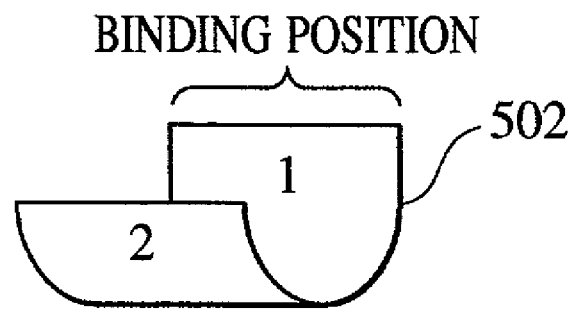

Furthermore, the following inconvenience may be encountered in the conventional art. For example, a case of a document comprising pages 1 and 2 are in A4 size and pages 3 and 4 in A3 size to be two-sided printed will be described. When conducting two-sided printing, it is the conventional practice to specify a binding position. When a binding position in a case of two-sided printing is specified along the longer side of paper as shown by 501 in FIG. 5, the left side (or right side) is bound for turning over a page because the paper is set in the longitudinal direction. The top and bottom of an image on the back agree with those on the surface. When binding along the shorter side of paper is specified as shown by 502, the top side (or the bottom side) of paper will be bound, resulting in a reversed top-bottom of the image on the back relative to that on the surface.

Figure 6A:
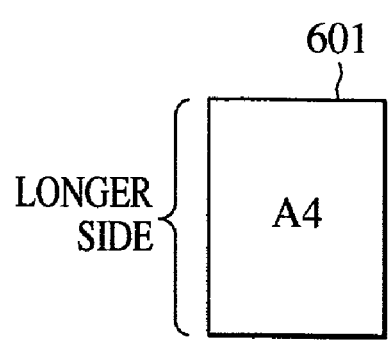
FIG. 6 illustrates a result of a paper feed of the printing control unit in the case of two-sided printing of a document comprising paper sizes in mixture, and where the host computer specifies a binding position for the entire job.
Figure 6B:
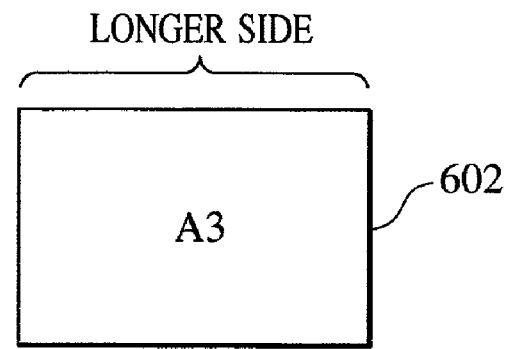
Figure 6C:
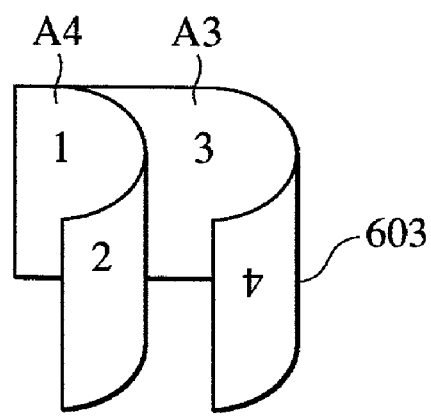
Figure 7A:
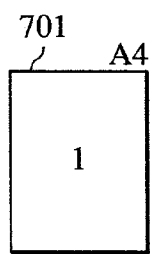
FIG. 7 illustrates document data comprising a mixture of paper sizes used in this embodiment.
Figure 7B:
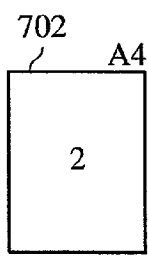
Figure 7C:
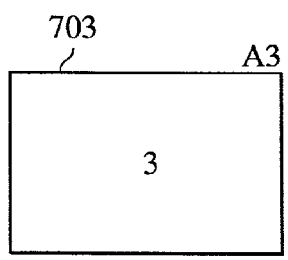
Figure 7D:
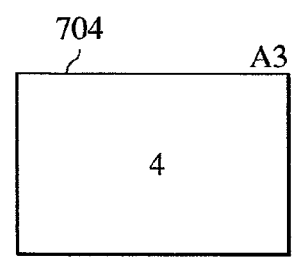

When printing this document, the binding position is specified for the overall drawing data in the conventional art. When the binding position is specified along the "longer side", therefore, the longer side of A4 is to the left as shown by 601 in FIG. 6 where the binding position is located. In the case of A3, the longer side is on the top side as shown by 602, where the binding position is located. When the printer draws an image in compliance with this setting, the image on the back of the final A3 page becomes top-side down as shown by 603. When viewing A4 and A3 as a comprehensive document, the image direction is not uniform in this output.

As means to solve this problem, there is conceivable a method of turning the image by adjusting the binding direction of the following page so as to be in agreement with the binding direction of the top-page paper. In this technique of adjusting the binding direction to that of the top-page paper on the printing control unit side, when asking printing in the middle of a document by the printer driver, printing from page 3, the image on the A3 laterally set sheet of paper is turned to become top-side down because binding along the longer side is specified as printing setting, leading to a problem in that user's desired result of paper delivery is unavailable.

Embodiments of the invention will now be described in the sequence of printing of a document.

In this embodiment, the "standard paper" and the "mixture pattern" are added as set attributes of a printing job generated by a printer driver 1803; the user sets these attributes on a user interface of the printer driver; and conducts selection of an appropriate output paper and formation of an image on the basis of these set values sent from a host computer on the printing control unit side.

First, a document comprising pages 1 and 2 of longitudinally set A4 sheets and pages 3 and 4 of laterally set A3 sheets is prepared as shown in FIG. 7, by use of an appropriate document preparing application 1801 on the host computer. A case where two-sided printing of these document data is executed on the printing control unit via the printer driver program 1803 of the invention will be described. It is assumed that, in this case, the user expects the binding position of this document to be located on the left side (bound along the longer side (left)) with longitudinally placed A4-sized paper. The user expects the binding position to be along the shorter side (left) for A3-sized paper for the following pages, i.e., on the left side when A3-sized sheets are placed in the lateral direction.

Figure 8:
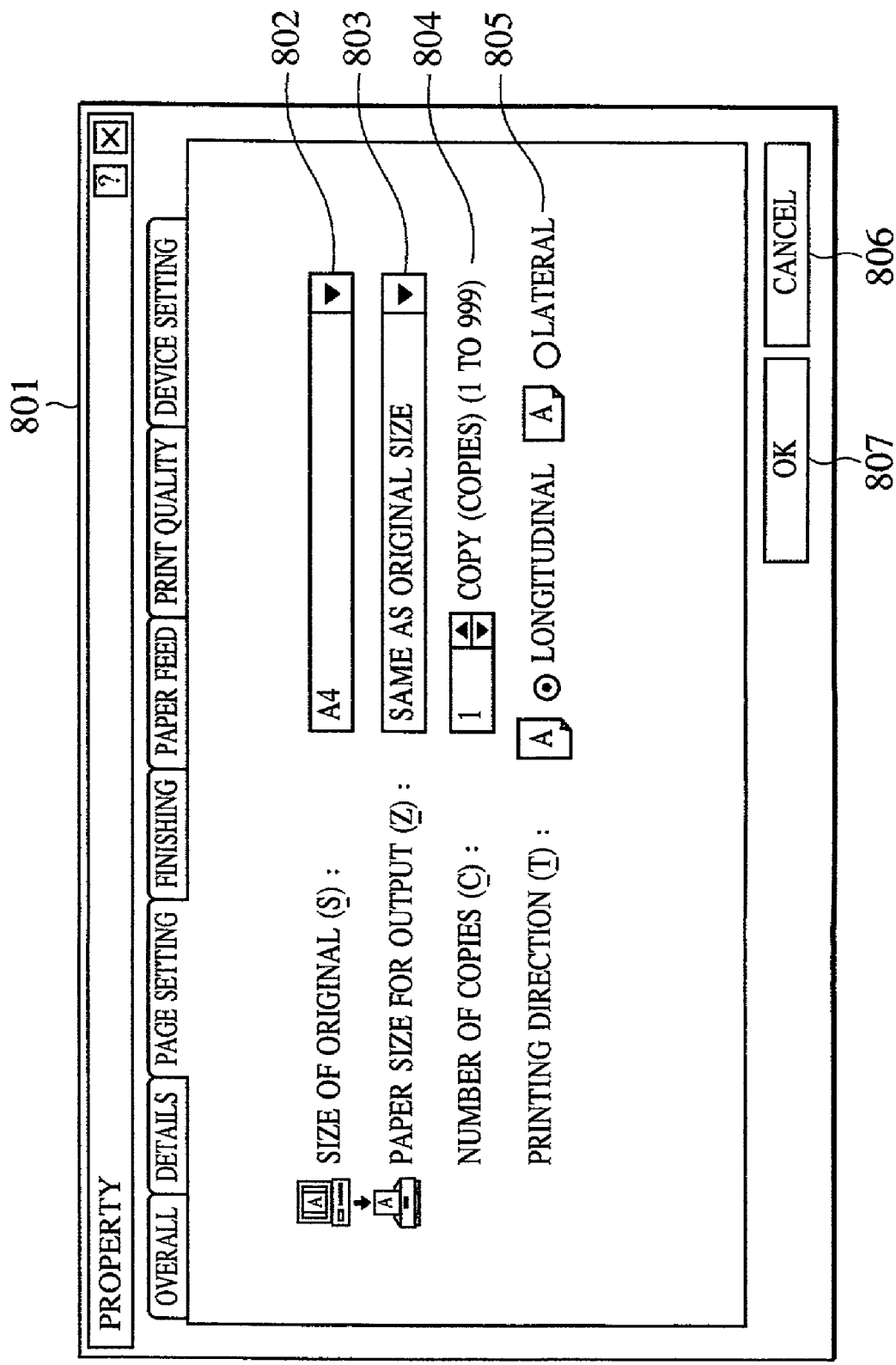
FIG. 8 is a view of a user interface of a page-set dialog provided by the printer driver of the invention.

When preparing this document, the user first sets the paper by use of a print setting sheet of the printer driver 1803. FIG. 8 illustrates a user interface of the printer driver 1803 performing setting regarding paper. The screen configuration of this user interface is provided by the printer driver 1803 to the OS, and displayed on a CRT 1710 which is a display section from the OS to the display driver (not shown; stored in an external memory 1711 and rastered in the RAM 1702 upon startup). Reference numeral 801 represents a property dialog of the printer driver; 802, an original size setting control setting a paper size prepared by the application 1801; 803, an output paper size setting control which sets an output size which is the paper size fed in the printing control unit; 804, a number of copies control which sets a number of copies; 805, a printing direction specifying control which specifies the image direction; 806, a cancel button for invalidating setting; and 807, an OK button for validating setting. In this dialog, the specification sets forth causing the application 1801 to inform the printer driver of the paper size for the top page (OS specification). The original size setting 802 is automatically set as "A4" (paper size for the top page) informed by the application 1801.

At this point in time, the user sets the output paper size setting 803 as A4 to begin the document with A4 size. For the purpose of solving the setting load on the user, the printer driver has an item "same as original size" in the printer driver of this embodiment. This item is a setting to the effect that a size in agreement with the original size which is the paper size entered from the application is used as the output paper size. In the application 1801, on the other hand, the image of A4 on the top page has been prepared in the longitudinal direction. The printing direction setting control 805 therefore selects "longitudinal". The setting regarding the paper size is thus completed, and by pressing the OK button 807, the setting becomes valid.

Before starting printing of the document data generated by the application 1801 as shown in FIG. 7, in this embodiment, the user must perform setting of mixture by the property dialog of the printer driver, because the document-data comprise a size-mixed document (A4 and A3).

Figure 9:
FIG. 9 is a view of a user interface of a finishing-set dialog provided by the printer driver of the invention.
Figure 10:
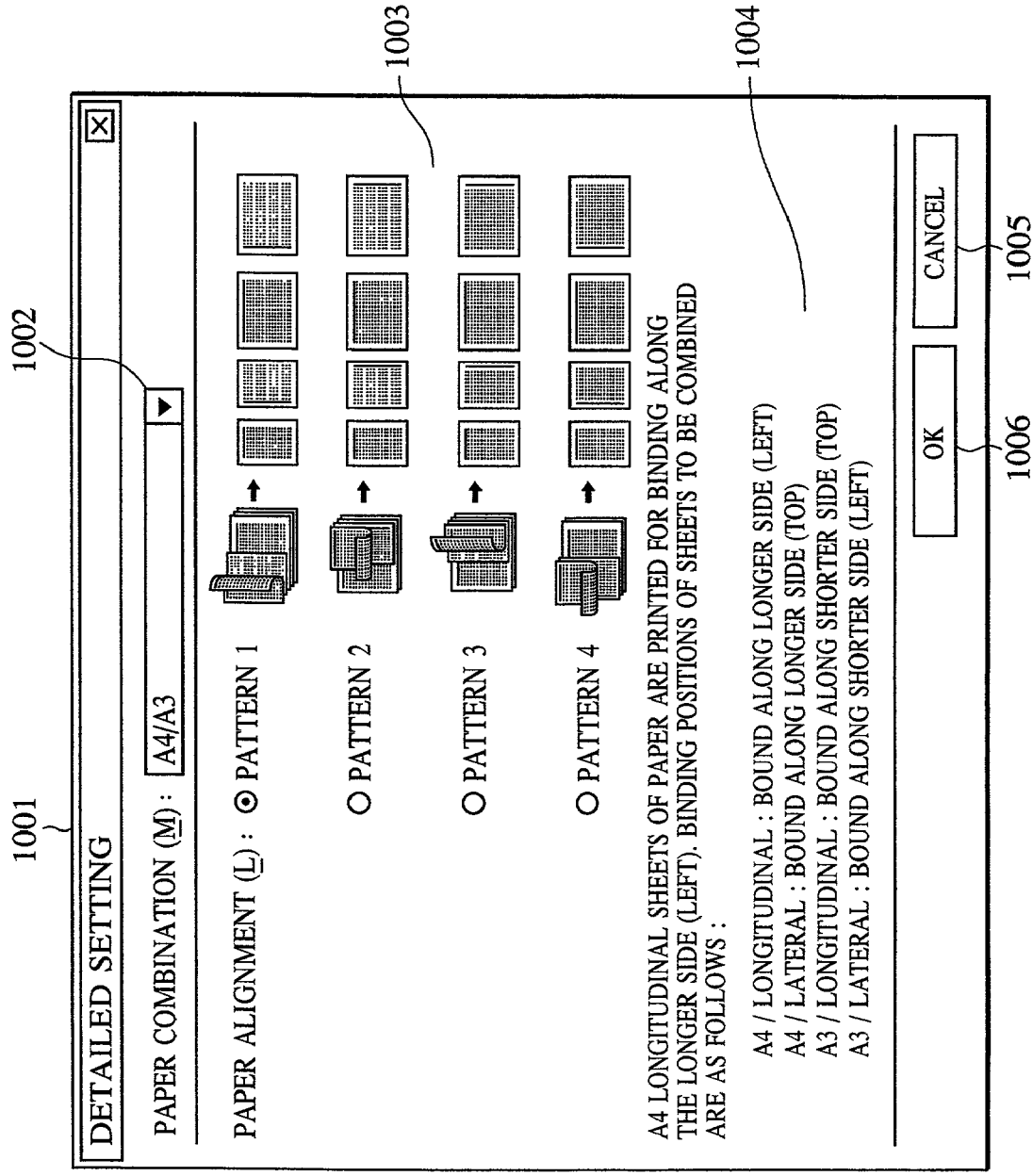
FIG. 10 is a view of a user interface of a mixed size details-set dialog provided by the printer driver of the invention.
Figure 11:
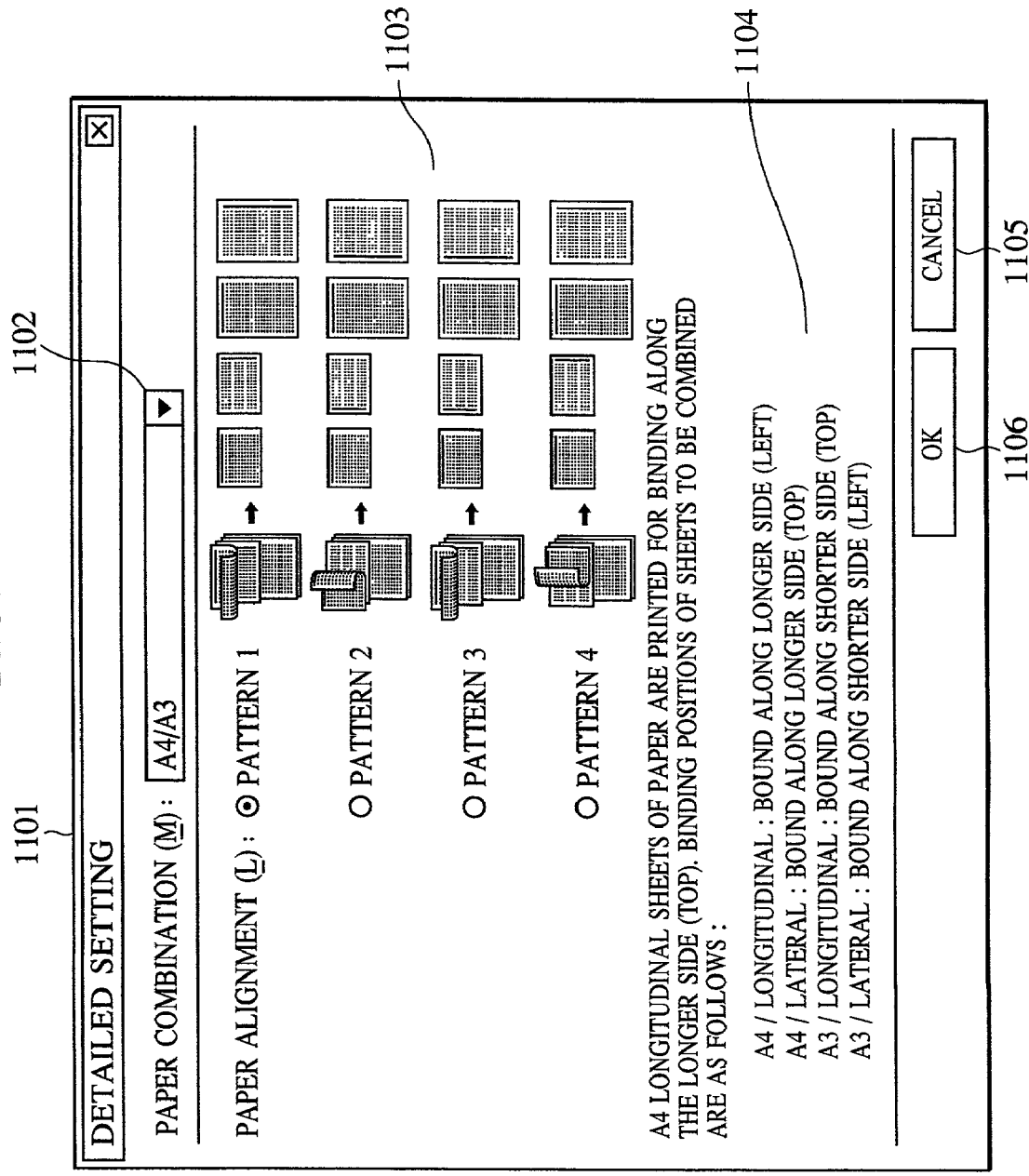
FIG. 11 is a view of a user interface of a mixed size details-set dialog provided by the printer driver of the invention.

FIGS. 9 to 11 illustrate dialogs of the printer driver 1803 conducting setting of paper size mixture: 901 represents a property dialog performing setting regarding "finishing setting" from among the printing settings of a document. In this dialog, 902 represents a control which sets a printing method such as "one-sided printing", "two-sided printing" or "binding printing"; 903, a mixed-size setting (control) which sets whether or not this is a mixed-size document, a feature of the invention; 904, a button becoming valid upon specification of the mixed-size setting 903, which display a dialog for setting a mixed-size pattern upon outputting the mixed-size document; 905, an area displaying detailed information shown when setting a mixed-size document by 903; 906, a control group specifying finishing of a document; 907, a cancel button for invalidating a setting; and 908, an OK button for validating a setting.

In this dialog, in order to output a mixed-paper document for the both sides, it is necessary to select "two-sided printing" in the printing method setting control 902, and for setting that this is a mixed-size document, the mixture setting control 903 must be converted into the check state.

In FIG. 10, 1001 represents a mixed size detail setting dialog displayed when pressing down a detail setting button 904 shown in FIG. 9. In the mixed size detail setting dialog 1001, 1002 represents a paper combination specifying control (referred to also as a "standard paper setting") which specifies the kind of size mixture forming a feature of the invention; 1003, a paper alignment control (also referred to as "paper delivery pattern setting") which specifies an output pattern; 1004, a pattern information display area which describes a selected pattern; 1005, a cancel button invalidating a setting; and 1006, an OK button validating a setting.

In this mixed-size detail setting dialog 1001, in the case of mixture A4/A3, it is necessary for the user to select "A4/A3" by means of the paper combination control 1002. In the printer driver of this embodiment, the combination control 1002 supports candidates for selection "A4/A5", "Letter/Legal" and "Letter/11×17" in addition to "A4/A3".

When the paper delivery pattern of longitudinally placed A4 is adopted in the paper alignment control 1003, requiring binding on the left side, it is necessary to select pattern 1. It is thus possible for the user to select a user's desired paper delivery pattern from a plurality of paper delivery patterns.

The dialog shown in FIG. 11 is for a case where, upon setting a paper size in the paper setting property dialog 801, "lateral" is set through control of the A4 size image direction, i.e., the printing direction. In this case, since the smaller paper size leads to laterally placed A4, the picture of the output image is associated with that setting, the output image interlocks with the setting as shown by 1103.

As described above, the printer driver of the invention provides a paper delivery pattern different for each paper direction.

A procedure for generating printing data on the basis of a drawing function (DDI function) acquired by the printer driver 1803 from the application 1801 via the OS (FIG. 14), and a procedure for receiving and actually print-outputting the printing data by the printing control unit 103 (FIG. 16) will now be described. In this embodiment, A4 sheets are longitudinally set in the paper feed cassettes 201 and 202 (paper transfer direction 301) of the printing control unit 103; A4 sheets are laterally set in the cassette 203 (paper transfer direction 302); and A3 sheets are laterally set in the cassette 204. While the A4-sized paper can be placed laterally or longitudinally, the A3-sized paper close to the maximum of sizes supported by this printer can be placed only laterally.

Figure 14:
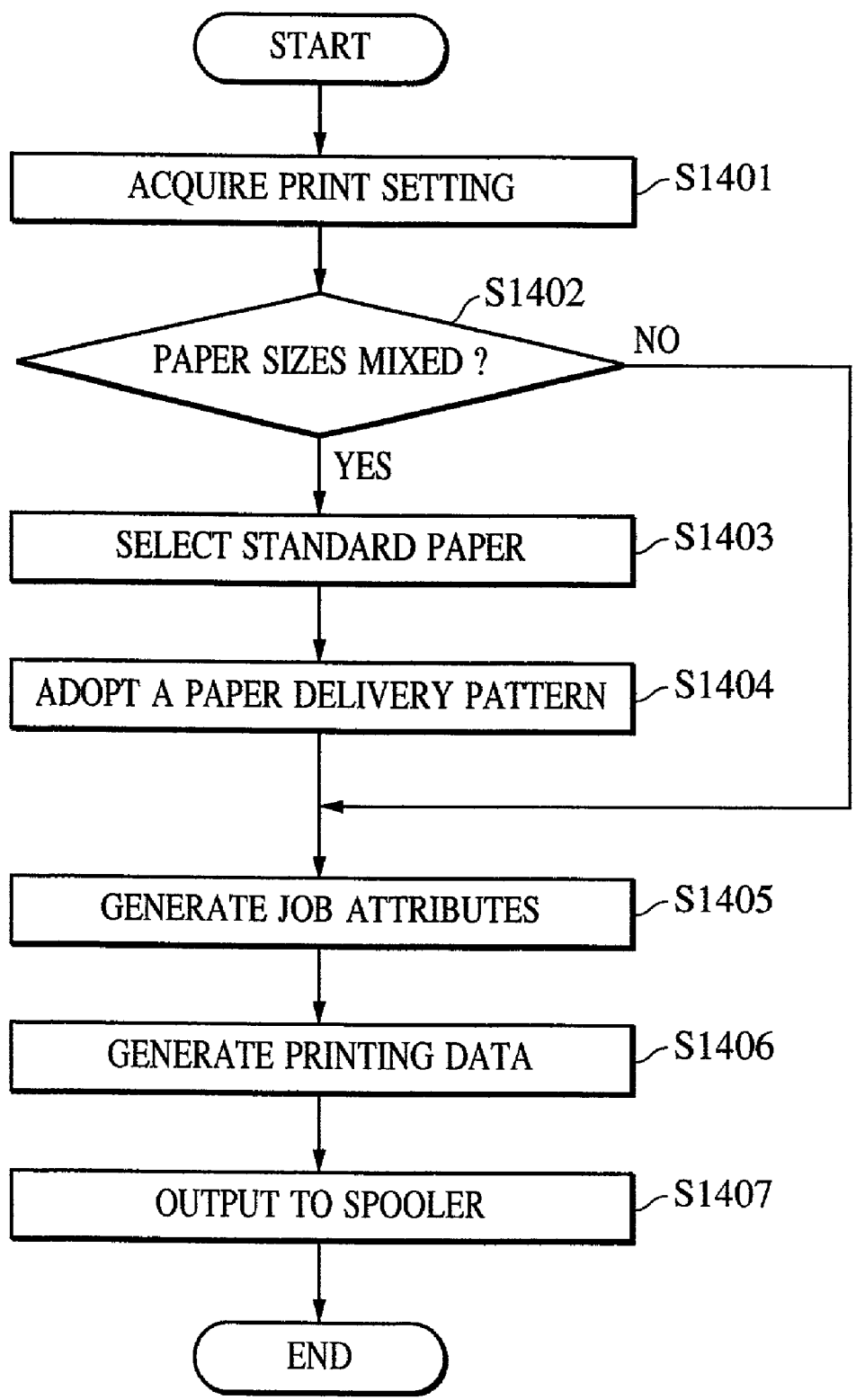
FIG. 14 is a flowchart for illustrating the control processing executed by the information processing unit on the basis of the printer driver program of the invention.
Figure 15:
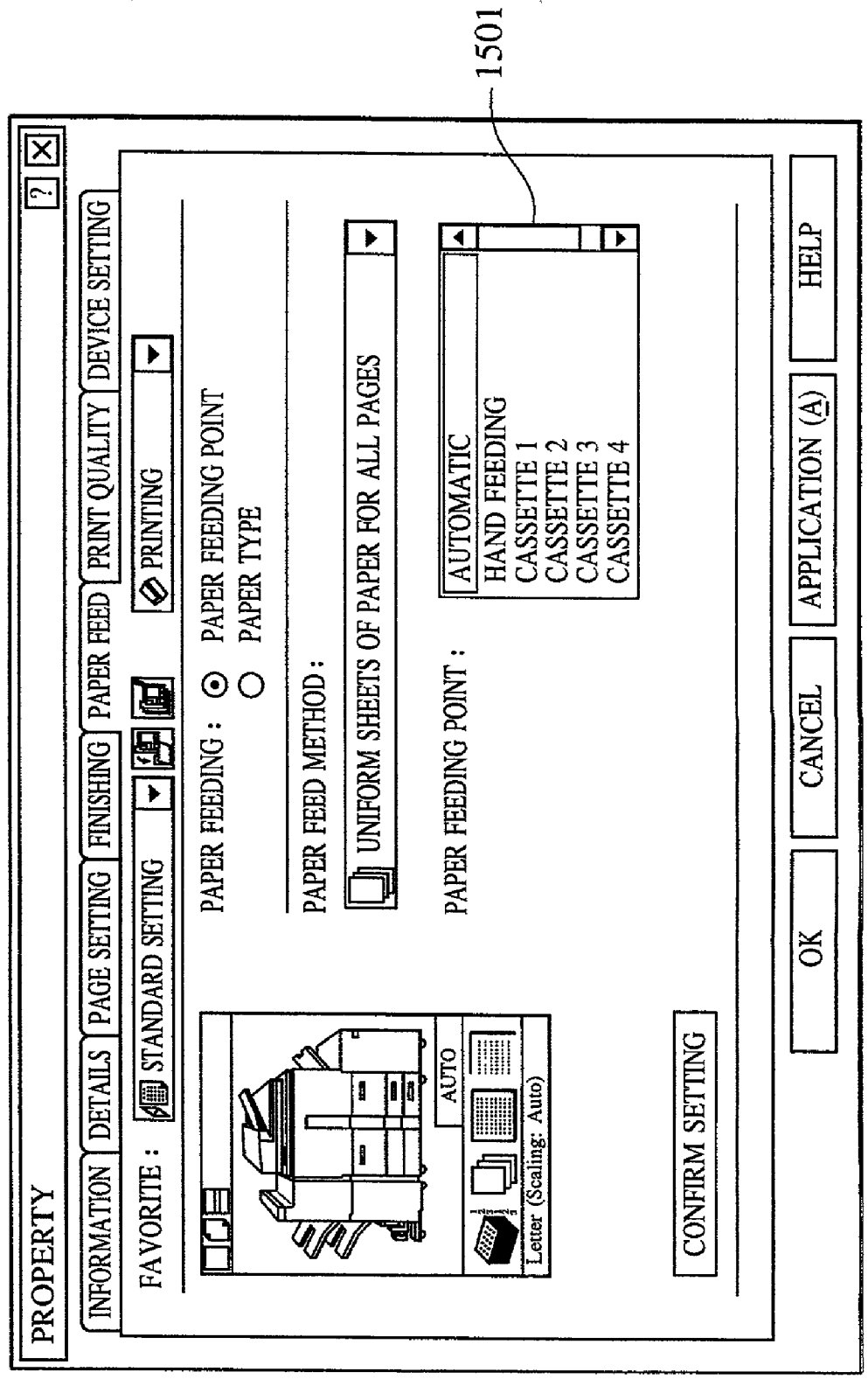
FIG. 15 is a view of a user interface of the dialog performing paper feed setting provided by the printer driver.

FIG. 14 is a control flowchart of the host computer 101 which is the information processing unit of the invention. This control is achieved through rastering of the printer driver program 1803 stored in the external memory 1711 into the RAM 1702 and execution thereof by the CPU 1701. This processing is started by issuance of a printing request from the application 1801 to the graphic engine 1802 of the OS and output of the drawing function (GDI function).

First in step S1401, the printer driver 1803 acquires printing conditions set in the property sheet (FIGS. 8 to 11). The printing conditions have been set by the user prior to start of printing as described above. In step S1402, the printer driver 1803 determines whether or not the mode is the mixed-paper mode with reference to the acquired printing conditions. A case where the mixed-size setting 903 has been checked up in FIG. 9 is determined to be in the mixed-paper mode. When the mode is determined to be in the mixed-paper mode, the process advances to step S1403, and if not, the process goes to step S1405.

In step S1403, the printer driver 1803 reads in the setting of the paper combination control (standard paper setting) 1002 shown in FIG. 10, and determines a standard paper. The term the standard paper means paper which can be fed only in one direction among combinations of paper sizes: for example, in the case of A4/A3 paper mixture, the standard paper would be A3. That is, the printer driver 1803 informs the printing control unit that the case is a mixed-paper printing job using A3 as standard paper, and as a result, the printing control unit learns that it suffices to feed longitudinally set A4 paper, i.e., in the longer side direction. In the case of A4/A5 paper mixture, the standard paper would be A5. In this case, it suffices for the printing control unit to feed laterally set A4 paper, i.e., in the shorter side direction.

Then in step S1404, the printer driver 1803 reads in the setting of the paper alignment control (paper delivery pattern setting) in FIG. 10, and determines a paper delivery pattern. A delivery pattern specifies a manner of alignment of sheets of paper upon delivery after printing in the printing control unit. For example, when the user (or a specification provided by the application) has set longitudinally placed A4 paper or laterally set A3 paper in properties of page setting as shown in FIG. 8, there exist four paper delivery patterns 1003 as shown in FIG. 10. When the user (or the specification provided by the application) has set laterally placed A4 paper or longitudinally placed A3 paper, there exist four paper delivery pattern as shown in FIG. 10.

In step S1405, the printer driver 1803 generates job attribute information. Job attribute information comprehensively gives attributes (printing conditions) for an entire printing job such as a color processing mode, a number of copies, or a resolution. By adding them as attributes to the header of the printing data, the printing control unit can know the attributes of the printing job only through analysis of this header portion without the need to analyze the printing data themselves. When the case is determined to cover mixed paper sizes in step S1402, the printer driver 1803 generates, by adding to the job attributes, the "standard paper information" and "paper delivery information" determined in steps S1403 and S1404. When the case is determined not to be mixed paper in step S1402, the printer driver 1803 performs generation of the job attributes necessary as a printing job as described above, and generates job attributes with standard paper information or paper delivery pattern information as a null-value (job attribute generating step).

In step S1406, the printer driver 1803 generates printing data by converting the data into a printer control language (also referred to as a "page describing language") capable of being interpreted by the printing control unit on the basis of the DDI function entered from the graphic engine 1802. The printer driver 1803 generates a printing job by combining the thus generated printing data with the job attributes generated in the preceding step (printing job generating process).

Figure 12:
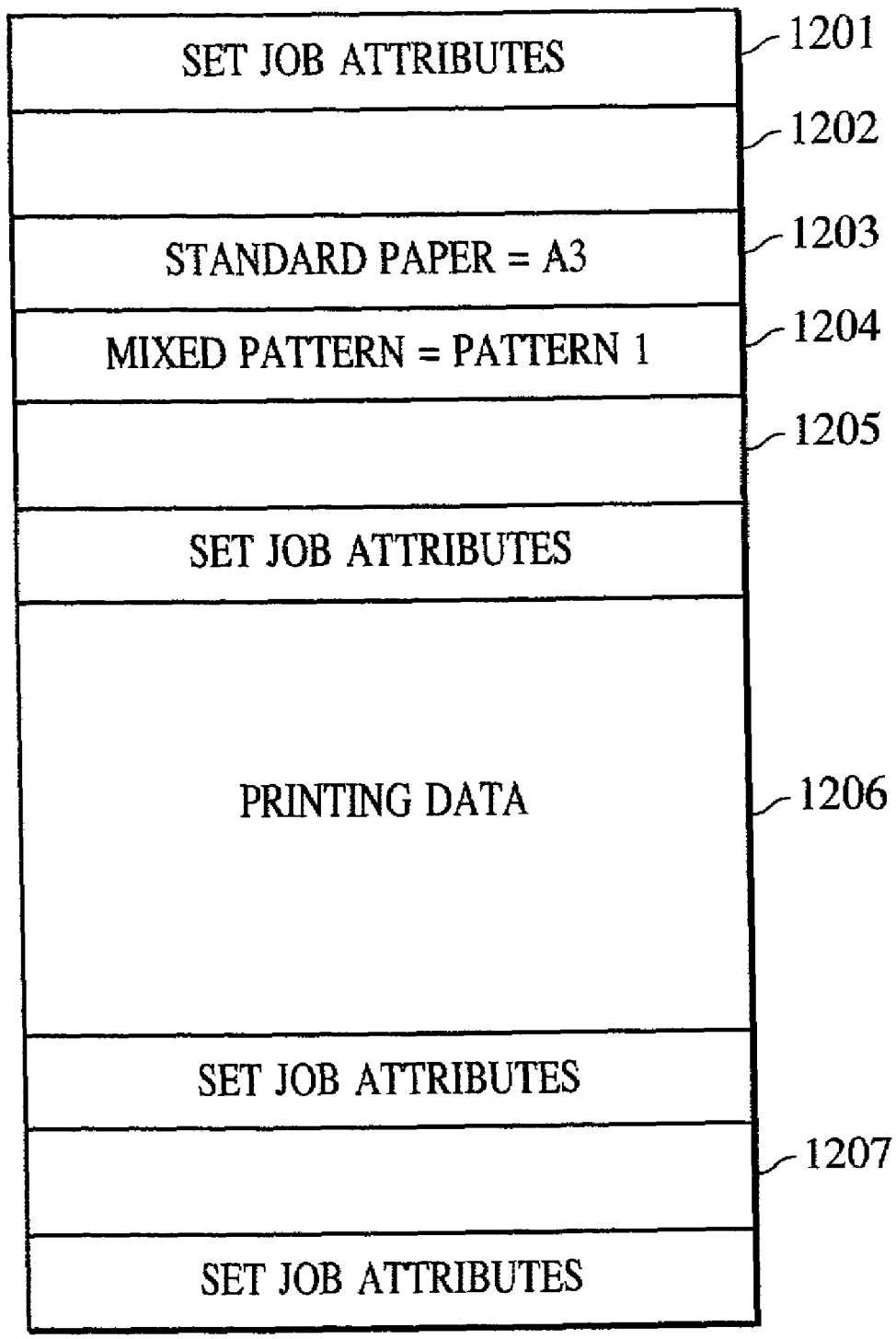
FIG. 12 is a data configuration diagram for illustrating the configuration of the job attributes and printing data contained in the printing job generated by the printer driver of the invention.

FIG. 12 illustrates data including the printing job attributes generated by the printer driver 1803: 1201 represents data generated by the printer driver; 1202, setting of job attributes; 1203, setting of "standard paper"attributes; 1204, setting of "mixed-paper pattern" attributes; 1206, printing data (described in a page describing language); and 1207, setting of job attributes. Reference numerals 1202, 1205 and 1207 suggest that there are available set attributes other than the "standard paper" and "mixed-paper pattern": while such attributes are not specifically described in this embodiment, they include, for example, Nup (a processing of compressing N pages into one printing sheet), user information, and the name of font used.

The format of the setting method suffices to be uniform between the printer driver 1803 and the printing control unit (printer, MFP). This embodiment gives only one example, and any other format may be used.

In this embodiment, as described above, the "standard paper information" sets kinds of paper not placeable longitudinally and laterally as standard paper from among the kinds of mixture selected. In this case, since the A4/A3 mixture is selected, the standard paper would be "A3" because A4 paper can be placed longitudinally or laterally. upon delivering A4 paper by the printer, a paper feed cassette is selected so as to feed paper from a proper paper direction on the basis of this information. In this embodiment, therefore, the standard paper attribute is set as "A3" as shown by 1203. While the standard paper information uses paper placeable only in a direction as standard, but the standard is not limited to this. For example in the case of A4/A3 mixture, "longitudinally set A4" may be adopted in the "standard paper information", or in the case of A4/A5 mixture, "laterally set A4", not "A5", may be used as "standard paper information".

In this embodiment, because pattern 1 is selected as the mixture pattern by the mixed size detail setting dialog 1001 shown in FIG. 10, pattern 1 is set in the "paper delivery pattern (mixed-size pattern)" of job attributes shown in FIG. 12 as shown by 1204. The other job attributes are appropriately set in 1202, 1205 and 1207. The document data are converted into printing data 1206 capable of being interpreted by the printer, and a printing job is generated.

In step 1407, the printer driver 1803 outputs the printing job comprising the job attributes and the printing data to a system spooler 1804. The system spooler 1804 sends the printing job directly to the printer which is the printing control unit, or to a print server (not shown) on the network.

In this embodiment, as described above, a combination of paper mixtures makes it possible to primarily derive a standard paper, and by the printer driver 1803's setting of the standard paper information as included in the job attributes of the printing job, it is possible to cause the determination of in which direction the paper should be fed to longitudinally and laterally placeable paper before starting printing of the first page by the printing control unit.

In this embodiment, it is possible to determine whether or not it is necessary to cause rotation of the printing data before start of printing of the first page by the printing control unit by printer driver 1803's setting a paper delivery pattern as included in the job attributes of the printing job.

For example, when pattern 1 is specified as a paper delivery pattern, the printing control unit would feed longitudinally placed A4 paper (from the longer side direction) and conduct printing without rotating the printing data. When pattern 3 is specified as a paper delivery pattern, on the other hand, the printing control unit would feed longitudinally placed A4 paper (from the longer side direction) and conduct printing by causing a 180° rotation of the printing data. This is because, when the printing control unit of this embodiment conduct longer side binding as a staple device, restrictions on the device limit binding in only one direction, and by rotating by 180° of the printing data, the result of paper delivery ensures coping with binding in the both directions. If a staple device (without restrictions on the device) capable of coping with binding in the both directions is attached to the printing control unit, it is not necessary to rotate the data by 180°, and it suffices for the printing control unit to instruct the staple device in which direction stapling is to be conducted.

Figure 13:
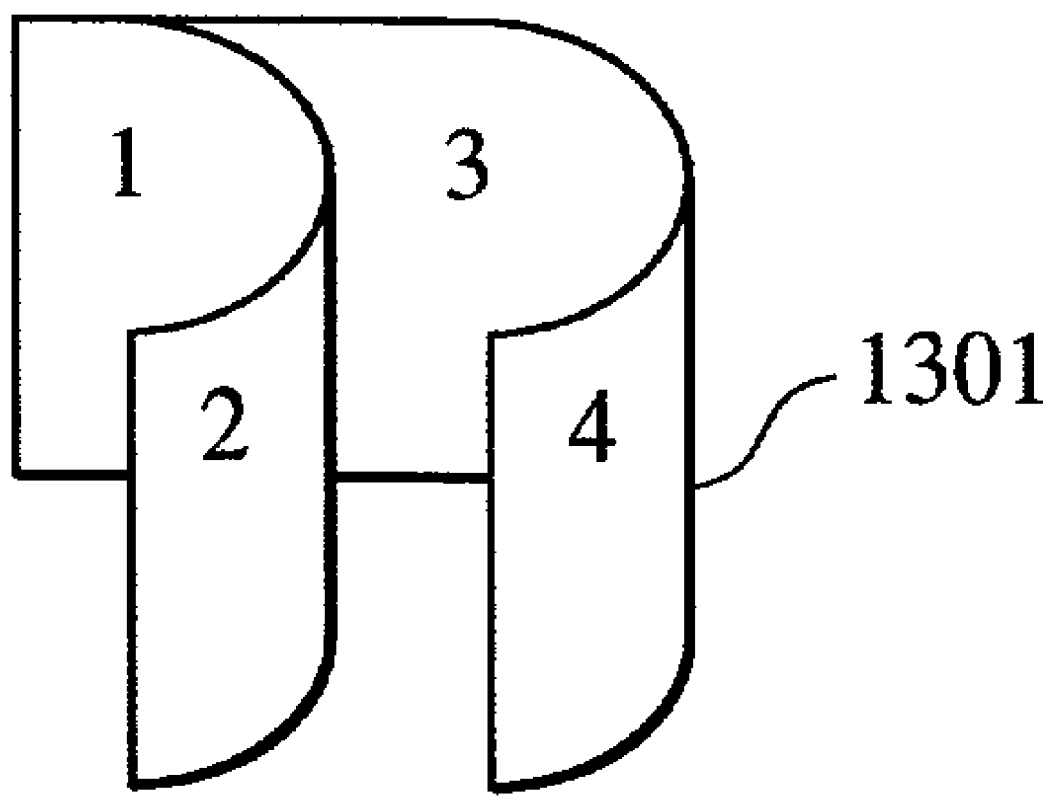
FIG. 13 illustrates a paper delivery result in the case where document data comprising a mixture of paper sizes available by executing control of the invention are subjected to two-side printing.

FIG. 13 is an image drawing of paper delivery result desired by the user in a case where the printing job shown in FIG. 12 is printed. It is desirable to perform printing so that the top-bottom direction is not reversed for pages of A3 paper upon two-side printing.

Figure 16:
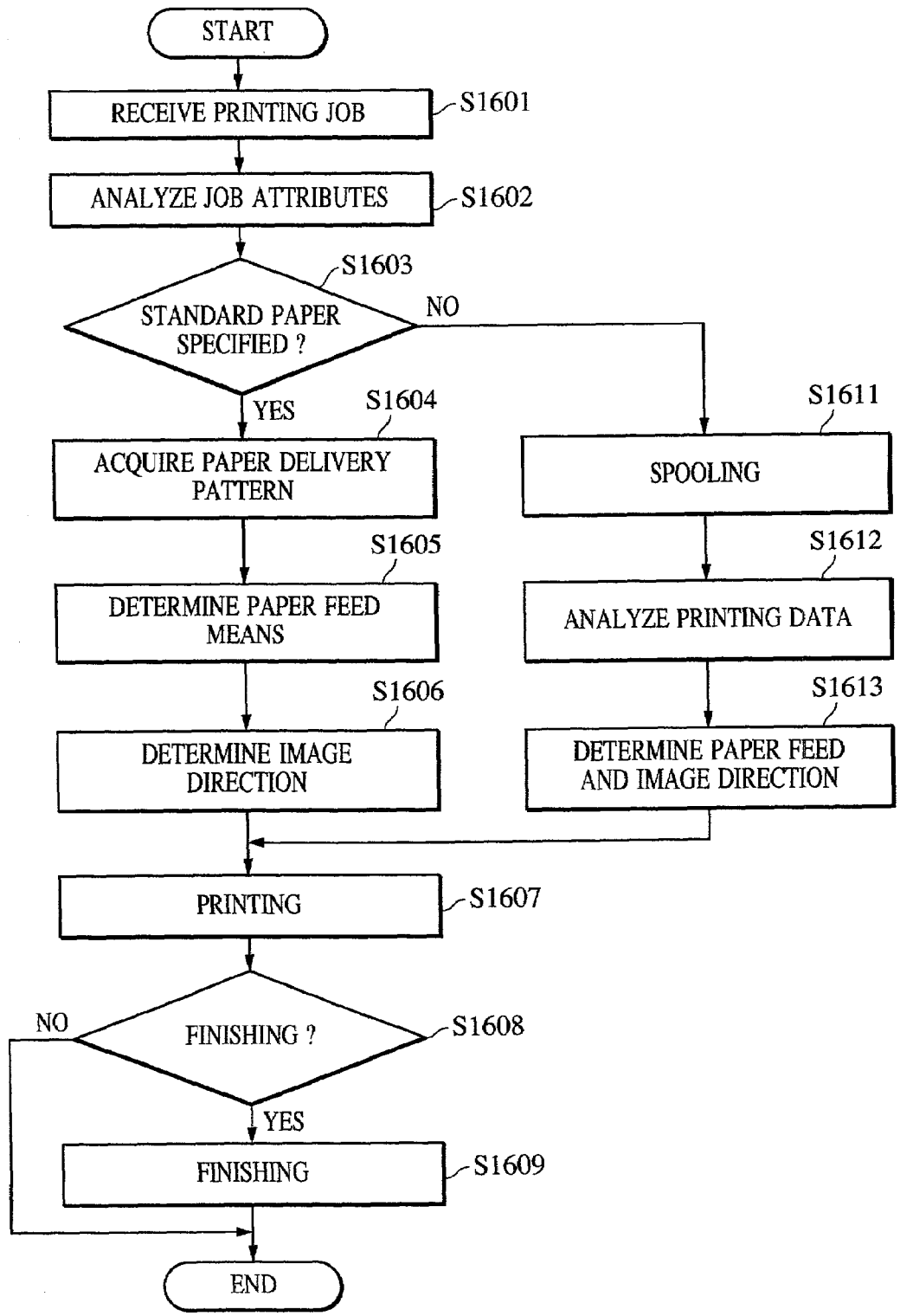
FIG. 16 is a flowchart illustrating the control flow executed by the printing control unit of the invention.

FIG. 16 is a control flowchart of the printer 103 which is the printing control unit of the invention. This control is accomplished as a result of rastering of the printing control program stored in the external memory 1714 into the RAM 1719 and the CPU 1712 executes the same. This processing is started by entering a printing request.

First in step S1601, the printing control unit receives the printing job. The printing job may be received directly from the host computer 101 (102) which is an information processing unit, or may be received from a print server (not shown) on the network.

In step S1602, the printing control unit analyzes job attributes 1202 to 1205 of the received printing job (FIG. 12). In step S1603, the printing control unit determines whether or not the printing job is a mixed-paper printing job bearing a standard paper specification. When it is determined that it is a mixed-paper job with a standard paper specification, the process advances to step S1604. If the job is determined to be a printing job without a standard paper specification, i.e., without paper mixture, the process proceeds to step S1611.

In step S1604, the printing control unit acquires standard paper information and paper delivery pattern information from the job attributes. In step S1605, the printing control unit determines which paper feed means is to be used on the basis of the thus acquired standard paper information. For example, when the standard paper information specifies A3 (or A4 longitudinal: meaning the same thing), it is determined that the paper feeding means of A4 longitudinal is used for a page of an output paper size of A4, and that the paper feeding means of A3 lateral is used for a page of an output paper size of A3. When the standard paper information specifies "A5 (or A4 lateral: meaning the same thing), it is determined that a page of an output paper size of A4 would select the paper feeding means of A4 lateral, and a page of an output paper size of A5 would use the paper feeding means of A5 longitudinal.

Then in step S1606, the printing control unit determines the image direction on the basis of the paper delivery pattern information acquired in step S1604. For patterns 1 and 3, an image is generated so that the top-bottom direction is uniform for the surface and the back upon two-side printing. For patterns 2 and 4, it is considered necessary to generate an image so that the top-bottom direction is reversed between the surface and the back upon two-side printing. The image direction serving as a standard is determined also for patterns 1 and 3 (or patterns 2 and 4). This varies with the staplable position and the paper delivery direction (face-up/face-down) of the staple device. For example, when the paper delivery pattern information covers "pattern 1", it is not necessary for the printing control unit of this embodiment to conduct rotation of the printing data, but it suffices to carry out rastering of the printing data and printing. When the paper delivery pattern information covers "pattern 3", on the other hand, it is necessary to conduct printing after performing 180° rotation upon rastering the printing data. Because even for A4 longer side binding, arrangement of A4 sheets relative to the A3 sheets is different between patterns 1 and 3, and it is necessary to provide the binding position closer to the paper delivery port upon paper delivery. For pattern 1, it is necessary to deliver the paper from left to right. For pattern 3, it is necessary to deliver the paper from right to left. As a result, the printing data direction is different by 180° between patterns 1 and 3. After determination of the image direction in step S1606, the process advances to the next step S1607.

When a printing job is determined to be one without a standard paper specification, i.e., without specification of paper mixture in step S1603, the printing job is spooled in step S1611, and the process does not advance to the next step until all the pages of the printing job are spooled. Upon the completion of spooling of all the pages, the printing control unit analyzes the spooled printing data and determines paper sizes for all the pages in step S1612.

In step S1613, the printing control unit determines from the paper sizes for all the analyzed pages whether or not the printing job is a mixed-paper printing job. If the job is not a paper-mixed job, a paper feeding means which can primarily derive from the paper size and the binding position is selected and the image direction is determined. If it is a paper-mixed job, paper feeding means of A4 longitudinal is selected for the case of A4/A3, and paper feeding means of A4 lateral is selected for the case of A4/A5, from the combination of paper sizes. The image direction on the A4 sheet is determined on the basis of the specification such as longer side binding (left), longer side binding (right), shorter side binding (top), and shorter side binding (bottom) as a specification of a binding position of the printing job. The image direction can primarily be derived from the specification of a binding position. More specifically, as described above, in the case of longer side binding, an image is generated so that the top-bottom direction is uniform between the surface and the back upon two-side printing. In the case of shorter side binding, it is necessary to generate an image so that the top-bottom direction is reversed between the surface and the back upon two-side printing. In longer side binding, the necessity of 180° rotation can be determined for all the pages from the difference in binding position between (left) and (right). Upon the completion of determination of the paper feeding means and the image direction, the process proceeds to step S1607.

In step S1607, the printing control unit feeds paper from the proper paper feeding means to the individual pages, generates printing data with the proper determined image direction, and performs printing of the printing data to the paper. Upon printing, for a printing job of mixed paper sizes, paper is fed only from the paper feeding means determined in step S1605 regarding processing of pages of paper sizes placeable longitudinally or laterally. Control should be applied so that paper feeding from paper feeding means not determined is not selected even when sheets of the determined paper feeding means have been exhausted. Therefore, even when "automatic" is selected as a selection of paper feeding means during setting of printing conditions by the printer driver 1803, the paper delivery result is collated with the other mixed paper sizes in the case of a printing job comprising mixed paper sizes. It is therefore possible to achieve control so that paper is not fed so as to result in a different paper direction.

In step S1608, it is determined whether or not there is available a specification of finishing for the printing job. If there is a specification of finishing, the printing control unit applies finishing such as stapling or punching in step S1609, thus completing the processing.

Because the printing control unit of this embodiment selects paper feeding means on the basis of the standard paper information specified in the job attributes, it is possible to accomplish printing by feeding paper from a proper paper feeding direction even when the output paper size for the first page is A4 and "automatic" is selected in the paper feeding setting of the printer driver.

The printing control unit of this embodiment determines the image direction on the basis of a paper delivery pattern information specified in the job attributes. It is therefore possible to carry out printing in a proper image direction on each page of the paper-mixed printing job. For example, it was conventionally necessary to specify a binding position for the printing job as a whole: even by specifying longer side binding for the first page of A4, if the user desires printing from middle of a page, and if the page is A3 in size, this printing job must comply with longer side binding, and a problem was encountered in that the top-bottom direction is revered between the surface and the back in two-side printing. In the printing control unit of this embodiment, however, even in a case of starting printing in the middle of a page, it is possible to accomplish proper printing by using a technique permitting recognition of longer side binding for A4 and shorter side binding for A3 by use of information of paper delivery pattern.

In this embodiment, as paper delivery patterns for A4 paper, longer side binding (left)/longer side binding (right)/shorter side binding (top)/shorter side binding (bottom) and portrait/landscape are provided, not longer side binding/shorter side binding alone. This permits previous determination as to whether or not a 180° rotation is to be conducted upon rastering the printing data.

In the printing control unit of this embodiment, printing is started after spooling all pages of the printing job and recognizing the paper sizes for the individual pages. It is therefore possible, for a mixed-paper printing job, even the first page requires a paper size placeable in any of longitudinal and lateral directions, to select proper paper feeding means.

In the printing control unit of this embodiment, printing is started after spooling all pages of the printing job and recognizing the paper sizes and the binding positions of the individual pages. It is therefore possible to determine, for a mixed-paper printing job, the image directions on the surface and the back upon two-side printing from the binding position.

In the printing control unit of this embodiment, it is possible to select proper paper feeding means and to start printing without the need to recognize the paper size through analysis of all the pages of a printing job with a specification of the mixed-paper job. Even for a printing job without a specification of a mixed-paper job, printing is started after recognizing the paper sizes through analysis of all pages. It is thus possible to select proper paper feeding means and cope with any printing job.

In the aforementioned embodiments, the present invention has been applied to equipment comprising a single unit (printer, copying machine, information processing unit, and host computer). The invention is applicable also to a system comprising a plurality of units (for example, a host computer and printers). When applied to a system, both processing of an information processing unit and processing of a printing control unit based on the printer driver are included.

The object of the present invention is achievable by reading out and executing program codes stored in a storage medium by use of a system or a computer of an equipment (or a CPU or an MPU) from the storage medium storing program codes of software for materialization of the functions of the aforementioned embodiments.

In this case, the program codes themselves read out from the storage medium achieve the functions of the above-mentioned embodiments, and the storage medium storing such program codes forms a component of the present invention.

Applicable storage media for supplying program codes include, for example, a floppy disk, a hard disk, an optical disk, a magneto-optical disk, a CD-ROM, a CD-R, a CD-RW, a magnetic tape, a nonvolatile memory card, an ROM, a DVD-ROM, and a DVD-RAM.

Execution of the program codes read out by the computer not only permits achievement of the functions of the aforementioned embodiments, but also materialization of the functions of the aforementioned embodiments by performing all or part of actual processing of the OS (operating system) operating on the computer on the basis of instructions of such program code.

The above-mentioned achievements include cases in which the program codes read out from the storage medium are written in a memory provided in the function expanding board inserted into a computer or a function expanding unit connected to a computer, a CPU or the like provided in such function expanding board or the function expanding unit performs all or part of actual processing in accordance with the instruction of such program codes, and such processing permits achievement of the functions of the aforementioned embodiments.

The program codes themselves installed in the computer for the purpose of achieving the functions of the invention on a computer permit accomplishment of the present invention. That is, computer programs themselves for achieving the functional processing of the invention are also included in the claims of the invention.

Methods for supplying this computer program is not limited to a case where the program is stored in an FD or CD-ROM and read into a computer for installation into the computer, but include a method of connecting a browser of a client computer to a home page of internet, and downloading from the home page the computer program itself of the invention or a compressed file containing an automatic installing function. This is also achievable by dividing the program codes forming the program of the invention into a plurality of files, and down-loading these files from different home pages. That is, the WWW server causing a plurality of users to down-load the program files for achieving the functional processing of the invention is also associated with the present invention.

It is also possible to encrypt the program of the invention, store it in a storage medium such as an FD, distribute it to users, causing users having cleared certain conditions to down-load key information for decrypting the cryptograph from a home page via internet, and permit them to install the program in their computer by executing the encrypted program by using such key information.

As many apparently widely different embodiments of the present invention can be made without departing from the spirit and scope thereof, it is to be understood that the invention is not limited to the specific embodiments thereof except as defined in the appended claims.

According to the present invention, as described above, when generating printing data on the basis of document data comprising a plurality of paper sizes, it is possible to select proper paper feeding means regarding the paper sizes placeable longitudinally or laterally by adding information for determining a standard paper, even when setting of the paper feeding means is "automatic" in a printing control unit receiving the printing data.

In the present invention, when generating printing data on the basis of document data comprising a plurality of paper sizes in mixture, it is possible to cause a proper rotation processing so that sheets are delivered in a paper arrangement desired by the user in the printing control unit receiving the printing data, by adding information for determining a paper delivery pattern, thus permitting obtaining a paper delivery result as desired by the user.

In the present invention, furthermore, when printing a received printing job comprising a plurality of paper sizes in mixture, appropriate paper feeding means is selected on the basis of information for determining a standard paper added to the job attributes. It is therefore possible to properly determine a direction for paper feeding regarding the paper sizes placeable in longitudinal or lateral directions even when "automatic" is set as a selection of paper feeding means. Even when starting printing from the middle of a page, it is possible to obtain a paper delivery result desired by the user.

In the present invention, when printing a received printing job comprising a plurality of paper sizes in mixture, the image directions on the individual pages are properly determined on the basis of information for determining a paper delivery pattern added to the job attributes. It is therefore possible to conduct a proper rotation regarding the image direction which cannot be determined from the paper size and the binding direction alone. Even when starting printing from the middle of a page, it is possible to obtain a paper delivery results as desired by the user.

In the present invention, when printing a received printing job comprising a plurality of paper sizes in mixture, it is determined whether or not there is available information showing a mixed-paper job in the job attributes. If there is available such information, mixed-paper printing is carried out on the basis of such information. If unavailable, mixed-paper printing is conducted after determining different paper sizes in the printing job. Therefore, mixed-paper printing can be properly carried out not only of a printing job having a mixed-paper specification from the most modern printer driver, but also of a printing job having not mixed-paper specification from a conventional printer driver. It is thus possible to provide a product excellent in multipurpose property.

What is claimed is:

1. An information processing unit, which generates printing jobs to be printing-processed on a printing control unit, in which a sheet of a specific paper size is placeable in a longitudinal direction and in a lateral direction, comprising:

paper combination setting means which, in the presence of mixed paper sizes, sets a combination of mixed paper sizes via a print setting screen;

paper alignment setting means which sets a paper alignment pattern from a plurality of paper alignment patterns in a case that the combination of mixed paper sizes is set by said combination setting means, wherein the paper alignment pattern specifies a pattern of a print image orientation and a binding location for the combination of mixed paper sizes;

job attribute generating means which generates standard paper information for specifying in which direction paper is to be fed on the basis of the combination of mixed sheets set by said paper combination setting means, and generates alignment pattern information for specifying in which direction the print image to be printed is drawn by the printing control unit on the basis of the paper alignment pattern set by said paper alignment setting means, and generates job attributes including the standard paper information and the paper alignment information; and printing job generating means which generates printing data, and generates printing jobs from said printing data and job attributes generated by said job attribute generating means.

2. An information processing unit according to claim 1, wherein said standard paper information indicates a paper size placeable only in one of machine and transverse directions in said printing control unit from among the mixed paper sizes.

3. An information processing method for generating printing jobs to be printing-processed on a printing control unit, in which a sheet of a specific paper size is placeable in a longitudinal direction and in a lateral direction, comprising:

a paper combination setting step which, in the presence of mixed paper sizes, sets a combination of mixed paper sizes via a print setting screen;

a paper alignment setting step which sets a paper alignment pattern from a plurality of paper alignment patterns in a case that the combination of mixed paper sizes is set in said combination setting step, wherein the paper alignment pattern specifies a pattern of print image orientation and binding location for the combination of mixed paper sizes;

a job attribute generating step which generates standard paper information for specifying in which direction paper is to be fed on the basis of the combination of mixed sheets set in said paper combination setting step, and generates alignment pattern information for specifying in which direction the print image to be printed is drawn by the printing control unit on the basis of the paper alignment pattern set in said paper alignment setting step, and generates job attributes including the standard paper information and the paper alignment information; and a printing job generating step of generating printing data, and generating printing jobs from said printing data and job attributes generated in said job attribute generating step.

4. An information processing method according to claim 3, wherein said standard paper information indicates a paper size capable of being placed only in one of the longitudinal and lateral directions in said printing control unit.

5. A computer-readable medium storing a printer driver program for executing in an information processing unit generating printing jobs to be printing-processed on a printing control unit, in which a sheet of a specific paper size is placeable in a longitudinal direction and in a lateral direction, which causes said information processing unit to execute:

a paper combination setting step which, in the presence of mixed paper sizes, sets a combination of mixed paper sizes via a print setting screen;

a paper alignment setting step which sets a paper alignment pattern from a plurality of paper alignment patterns in a case that the combination of mixed paper sizes is set in said combination setting step, wherein the paper alignment pattern specifies the pattern of the print image orientation and binding location for the combination of mixed paper sizes;

a job attribute generating step which generates standard paper information for specifying in which direction paper is to be fed on the basis of the combination of mixed sheets set in said paper combination setting step, and generates alignment pattern information for specifying in which direction the print image to be printed is drawn by the printing control unit on the basis of the paper alignment pattern set in said paper alignment setting step, and generates job attributes including the standard paper information and the paper alignment information; and a printing job generating step, of generating printing data and generating printing jobs from said printing data and job attributes generated in said job attribute generating step.

6. A computer-readable medium storing a printer driver program according to claim 5, wherein said standard paper information indicates paper sizes placeable only in one of the longitudinal and lateral directions in said printing control unit from among the mixed paper sizes.

7. A printing control unit which executes printing-processing of a printing job in a case of mixed paper sizes, comprising:

reception means which receives the printing job of which job attributes include standard paper information and alignment pattern information for specifying a pattern of a print image orientation and binding location for a combination of mixed paper sizes;

a plurality of paper feeding means which feed paper in a longitudinal or lateral direction for a specific paper size;

paper feeding selecting means which decides from which of said plurality of paper feeding means the paper is to be fed, as to a paper size placeable in the longitudinal or lateral direction, on the basis of the standard paper information included in the job attributes of the printing job in the case of mixed paper sizes; and drawing direction deciding means which decides a drawing direction of an image to be printed on the basis of the alignment pattern information included in the job attributes, wherein, when processing a page of the paper size placeable in the longitudinal or lateral direction upon printing-processing the printing job in the case of mixed paper sizes, the paper is fed from the paper feeding means selected by said paper feeding means selecting means, and the paper is not fed from the paper feeding means of a different paper direction.

8. A printing control unit according to claim 7, wherein said drawing direction selecting means which, when conducting two-side printing, decides whether or not the top-bottom direction is to be the same between the surface and the back of paper, on the basis of said paper delivery pattern information.

9. A printing control unit according to claim 7, wherein a plurality of pieces of said paper delivery information are provided for a combination of paper sizes and for setting of a binding position.

10. A printing control unit according to claim 7, wherein said standard paper information and said paper delivery pattern information are added only to the job attributes of printing job in a case of mixed paper sizes, and said standard paper information and said paper delivery pattern information become a null-value for job attributes of printing job in a case of paper sizes not mixed.

11. A printing control unit according to claim 7, wherein said standard paper information indicates the paper sizes placeable only in one of the longitudinal and lateral directions in said printing control unit, from among the mixed paper sizes.

12. A printing control method executing printing-processing of the printing job in a case of mixed paper sizes in a printing control unit having a plurality of paper feeding means for feeding paper in a longitudinal or lateral direction as to a specific paper size, comprising:

a receiving step of receiving the printing job of which job attributes include standard paper information and alignment pattern information for specifying a pattern of print image orientation and binding location for a combination of mixed paper sizes;

a paper feeding selecting step which decides from which of said plurality of paper feeding means paper is to be fed, as to a paper size placeable in the longitudinal or lateral direction, on the basis of the standard paper information included in the job attributes of the printing job in a case of mixed paper sizes;

a drawing direction deciding step which decides a drawing direction of an image to be printed on the basis of the alignment pattern information included in the job attributes; and a controlling step of feeding paper from the paper feeding means selected by said paper feeding selecting step when processing a page of a paper size placeable in the longitudinal or lateral direction, and feeding paper from the paper feeding means of a different paper placing direction, upon printing-processing the printing job of mixed paper sizes.

13. A printing control method according to claim 12, wherein said drawing direction selecting step is to decide, when conducting two-sided printing, whether or not the top-bottom direction is to be the same between the surface and the back of paper, on the basis of said paper delivery pattern information.

14. A printing control method according to claim 12, wherein a plurality of pieces of said paper delivery information may be provided for a combination of paper sizes and for setting of a binding position.

15. A printing control method according to claim 12, wherein said standard paper information and said paper delivery pattern information are added only to the job attributes of the printing job comprising paper sizes in mixture, and said standard paper information and said paper delivery pattern information become a null-value for job attributes of printing job comprising paper sizes not mixed.

16. A printing control method according to claim 12, wherein said standard paper information indicates the paper sizes placeable only in one of the longitudinal and lateral directions in said printing control unit, from among the mixed paper sizes.

* * * * *

UNITED STATES PATENT AND TRADEMARK OFFICE
CERTIFICATE OF CORRECTION

PATENT NO. : 7,170,631 B2
APPLICATION NO. : 10/119004
DATED : January 30, 2007
INVENTOR(S) : Sakura It is certified that error appears in the above-identified patent and that said Letters Patent is hereby corrected as shown below:

<u>Title Page Item (30),</u>
Foreign Application Priority Data, "2001/129742" should read -- 2001-129742 --.

COLUMN 1:
Line 45, "would" should be deleted.

COLUMN 5:
Line 9, "is ready to execution." should read -- are ready to be executed --.

COLUMN 7:
Line 1, "system." should read -- systems. --.

COLUMN 8:
Line 22, "but" should read -- it --.

COLUMN 10:
Line 10, "display" should read -- displays --.

COLUMN 11:
Line 46, "pattern" should read -- patterns --.

COLUMN 12:
Line 20, close up right margin;
Line 21, close up left margin;
Line 31, "upon" should read -- Upon --; and
Line 36, "but" should be deleted.

COLUMN 13:
Line 10, "conduct" should read --conducts --.

COLUMN 15:
Line 33, "revered" should read --reversed --.

COLUMN 16:
Line 51, "is" should read -- are --; and
Line 55, "internet" should read -- the Internet, --.

COLUMN 17:
Line 2, "internet," should read -- the Internet, --; and
Line 44, "results" should read -- result --.

UNITED STATES PATENT AND TRADEMARK OFFICE
CERTIFICATE OF CORRECTION

PATENT NO. : 7,170,631 B2
APPLICATION NO. : 10/119004
DATED : January 30, 2007
INVENTOR(S) : Sakura It is certified that error appears in the above-identified patent and that said Letters Patent is hereby corrected as shown below:

COLUMN 19:
Line 57, "means, which" should read -- means, --.

COLUMN 20:
Line 4, "printing" should read -- the printing --;
Line 6, "of" should read -- of the --; and
Line 57, "of" should read -- of the --.

Signed and Sealed this

Eleventh Day of December, 2007

JON W. DUDAS
*Director of the United States Patent and Trademark Office*